(12) United States Patent
Kurokawa

(10) Patent No.: US 8,791,974 B2
(45) Date of Patent: Jul. 29, 2014

(54) OPTICAL SCANNING APPARATUS AND IMAGE FORMING APPARATUS

(71) Applicant: Canon Kabushiki Kaisha, Tokyo (JP)

(72) Inventor: Shuichi Kurokawa, Saitama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/736,508

(22) Filed: Jan. 8, 2013

(65) Prior Publication Data

US 2013/0176374 A1 Jul. 11, 2013

(30) Foreign Application Priority Data

Jan. 10, 2012 (JP) .................................. 2012-002079

(51) Int. Cl.
*B41J 15/14* (2006.01)
*B41J 27/00* (2006.01)

(52) U.S. Cl.
USPC .......................................... 347/244; 347/258

(58) Field of Classification Search
USPC .................... 347/230, 241, 244, 256, 258; 359/205.1–207.5
See application file for complete search history.

(56) References Cited

U.S. PATENT DOCUMENTS

| 7,085,031 B2 * | 8/2006 | Tomioka | 359/205.1 |
| 7,477,437 B1 * | 1/2009 | Inagaki et al. | 359/207.1 |
| 2009/0002474 A1 | 1/2009 | Ishibe | |
| 2009/0009841 A1 * | 1/2009 | Ishibe | 359/207 |

FOREIGN PATENT DOCUMENTS

| JP | 2009-008896 A | 1/2009 |
| JP | 2009-014953 A | 1/2009 |

* cited by examiner

Primary Examiner — Hai C Pham
(74) *Attorney, Agent, or Firm* — Rossi, Kimms & McDowell LLP

(57) ABSTRACT

An optical scanning apparatus, including: a light source including a plurality of light emitting parts; a deflector including a deflecting surface; a first optical system configured to cause the plurality of light beams to enter the deflecting surface at an oblique angle; and a second optical system configured to focus the light beams on a surface to be scanned, in which: the light emitting parts are arranged away from each other; the second optical system includes an optical element including at least one optical surface having a non-arc shape, so that a wave optics interval between scanning lines based on barycentric positions of spot images on the surface to be scanned is aligned along the main scanning direction; the non-arc shape of the at least one optical surface of the optical element within the sub-scanning section is defined by a predetermined condition.

13 Claims, 16 Drawing Sheets

4th ORDER TERM OF ASPHERICAL
COEFFICIENT OF SAGITTAL LINE SHAPE

UNIFORMITY OF MAGNIFICATION IN
SUB-SCANNING DIRECTION ical scanning apparatus and image forming apparatus

BACKGROUND OF THE INVENTION

1. Field of the Invention

The present invention relates to an optical scanning apparatus and an image forming apparatus using the optical scanning apparatus. In particular, the present invention is suitable for an image forming apparatus using a plurality of light emitting elements (light emitting parts) as a light source, so as to achieve high speed and high density recording and using an electrophotography process, such as a laser beam printer, a digital copying machine, or a multi-function printer.

2. Description of the Related Art

Conventionally, a multi-beam optical scanning apparatus employing a plurality of light emitting elements (light emitting parts) as a light source has been widely used in a laser beam printer, a digital copying machine, and the like. As the multi-beam optical scanning apparatus, one having such a configuration that causes light beams to enter in parallel a surface perpendicular to a rotation axis of a deflecting surface of a deflector has been known. In this type of multi-beam optical scanning apparatus, scanning line pitches in a sub-scanning direction of scanning lines drawn on the same surface to be scanned by the light beams from a plurality of light emitting elements (light emitting parts) are set to be uniform in the whole effective scanning area. With this configuration, a magnification in the sub-scanning direction of an imaging optical system between the deflecting surface of the deflector and the surface to be scanned is set to be uniform in the whole effective scanning area.

On the other hand, in recent years, a configuration that causes the light beams to enter the plane perpendicular to the rotation axis of the deflecting surface of the deflector in a direction with an oblique angle with respect to the plane within a sub-scanning section (hereinafter referred to as an "oblique incident optical system") has often been used for scanning a plurality of surfaces to be scanned with a single deflector to downsize the apparatus. When a multi-beam light source is used in this oblique incident optical system, if the magnification in the sub-scanning direction of the imaging optical system is set to be uniform in the whole effective scanning area, a scanning line interval becomes non-uniform, causing an uneven interval. To cope with this problem, in Japanese Patent Application Laid-Open No. 2009-008896 (corresponding to US 2009/0002474), a method of achieving a uniform scanning line interval has been disclosed in which the magnification in the sub-scanning direction of the imaging optical system is set to be different between a scanning start side and a scanning end side.

Further, in Japanese Patent Application Laid-Open No. 2009-014953 (corresponding to US 2009/0009841), a technology for improving the performance has been proposed in which a sagittal line shape of an optical surface of the imaging optical system is formed in a non-arc shape, to meet a further demand for high density and high resolution recording. In Japanese Patent Application Laid-Open No. 2009-014953, both a field curvature correction in the sub-scanning direction and a reduction of the uneven scanning line interval caused by a shift of an image position in the sub-scanning direction due to a tangle of the deflecting surface are achieved by forming the sagittal line shape of the optical surface of the imaging optical system in a non-arc shape and varying an aspheric coefficient of the optical surface along a main scanning direction.

However, when the technology disclosed in Japanese Patent Application Laid-Open No. 2009-014953 is applied to a multi-beam optical scanning apparatus having the oblique incident optical system, the following problem occurs. That is, because the light beams respectively pass through different positions separated from each other in the sub-scanning direction on the optical surface having the non-arc sagittal line shape, barycentric positions of a spot intensity distribution are shifted from each other. Therefore, as described in Japanese Patent Application Laid-Open No. 2009-008896, even when the geometric optics interval of the scanning line based on principal ray arrival positions of the light beams from the light emitting elements (light emitting parts) are set to be uniform on the surface to be scanned in the main scanning direction, a wave optics interval of the scanning line is not uniform in the main scanning direction due to a barycentric position shift of a spot intensity distribution.

SUMMARY OF THE INVENTION

It is an object of the present invention to solve the above-mentioned problems and to provide a multi-beam optical scanning apparatus and an image forming apparatus which are configured to suppress a non-uniformity of a wave optics interval of the scanning line in a sub-scanning direction within an effective scanning area in a main scanning direction so as to form a high resolution image.

In order to achieve the above-mentioned object, according to an exemplary embodiment of the present invention, there is provided an optical scanning apparatus, including: a light source including a plurality of light emitting parts; a deflector including a deflecting surface and configured to deflect a plurality of light beams respectively emitted from the plurality of light emitting parts for scanning by the deflecting surface in a main scanning direction; a first optical system configured to cause the plurality of light beams to enter the deflecting surface of the deflector at an oblique angle within a sub-scanning section perpendicular to the main scanning direction; and a second optical system configured to focus the plurality of light beams deflected by the deflecting surface of the deflector on a surface to be scanned to form a plurality of spot images defining a plurality of scanning lines on the surface to be scanned, in which: the plurality of light emitting parts are arranged away from each other in a sub-scanning direction perpendicular to the main scanning direction and to a direction of an optical axis of the second optical system; the second optical system includes an optical element including at least one optical surface having a non-arc shape within the sub-scanning section, which asymmetrically varies in the main scanning direction, so that a wave optics interval in the sub-scanning direction between the plurality of scanning lines based on barycentric positions of the plurality of spot images on the surface to be scanned is aligned along the main scanning direction; when the non-arc shape of the at least one optical surface of the optical element within the sub-scanning section is defined by $$S = \frac{\frac{Z^2}{r'}}{1 + \sqrt{1 - (1+k)\left(\frac{Z}{r'}\right)^2}} + \sum_{k=1}^{16} \sum_{j=0}^{16} G_{jk} Y^j Z^k,$$

$$r' = r\left(1 + \sum_{i=2}^{10} D_i Y^i\right)$$

where S is the non-arc shape of the at least one optical surface of the optical element within the sub-scanning section, Y axis is an axis perpendicular to the optical axis in the main scanning direction, Z axis is an axis perpendicular to the optical axis in the sub-scanning direction, r is a curvature radius of the at least one optical surface on the optical axis within the sub-scanning section, r' is a curvature radius of the at least one optical surface within the sub-scanning section, $D_i$ is a variation coefficient of the curvature radius r', $G_{jk}Y^j$ is an aspheric coefficient, and the non-arc shape S includes a term of a fourth-order or higher.

Further, according to another exemplary embodiment of the present invention, there is provided an optical scanning apparatus, including: a light source including a plurality of light emitting parts; a deflector including a deflecting surface and configured to deflect a plurality of light beams respectively emitted from the plurality of light emitting parts for scanning by the deflecting surface in a main scanning direction; a first optical system configured to cause the plurality of light beams to enter the deflecting surface of the deflector at an oblique angle within a sub-scanning section perpendicular to the main scanning direction; and a second optical system configured to focus the plurality of light beams deflected by the deflecting surface of the deflector on a surface to be scanned to form a plurality of spot images defining a plurality of scanning lines on the surface to be scanned, in which: the plurality of light emitting parts are arranged away from each other in the main scanning direction and in a sub-scanning direction perpendicular to the main scanning direction and to a direction of an optical axis of the second optical system; a light emitting part whose spot image is formed first in the main scanning direction among the plurality of light emitting parts is arranged at a position closer to a plane perpendicular to the sub-scanning direction and including a center of the deflecting surface of the deflector with respect to a light emitting part whose spot image is formed last in the main scanning direction, so as to obtain a first characteristic in which an interval in the sub-scanning direction between the plurality of scanning lines based on positions of principal rays of the plurality of light beams on the surface to be scanned varies in the main scanning direction; the second optical system includes an optical element including at least one optical surface having a non-arc shape within the sub-scanning section, which asymmetrically varies in the main scanning direction, so as to obtain a second characteristic in which a sum of amounts of barycentric position shifts of the plurality of spot images with respect to the positions of the principal rays of the plurality of light beams on the surface to be scanned varies in the main scanning direction in a variation direction opposite to a variation direction in the first characteristic; when the non-arc shape of the at least one optical surface of the optical element within the sub-scanning section is defined by $$S = \frac{\frac{Z^2}{r'}}{1 + \sqrt{1 - (1+k)\left(\frac{Z}{r'}\right)^2}} + \sum_{k=1}^{16}\sum_{j=0}^{16} G_{jk} Y^j Z^k,$$

$$r' = r\left(1 + \sum_{i=2}^{10} D_i Y^i\right)$$

where S is the non-arc shape of the at least one optical surface of the optical element within the sub-scanning section, Y axis is an axis perpendicular to the optical axis in the main scanning direction, Z axis is an axis perpendicular to the optical axis in the sub-scanning direction, r is a curvature radius of the at least one optical surface on the optical axis within the sub-scanning section, r' is a curvature radius of the at least one optical surface within the sub-scanning section, $D_i$ is a variation coefficient of the curvature radius r', $G_{jk}Y^j$ is an aspheric coefficient, and the non-arc shape S includes a term of a fourth-order or higher.

Further features of the present invention will become apparent from the following description of exemplary embodiments with reference to the attached drawings.

DESCRIPTION OF THE EMBODIMENTS

Exemplary embodiments of the present invention are described in detail below with reference to the accompanying drawings.

First Embodiment

Image Forming Apparatus

Figure 25:
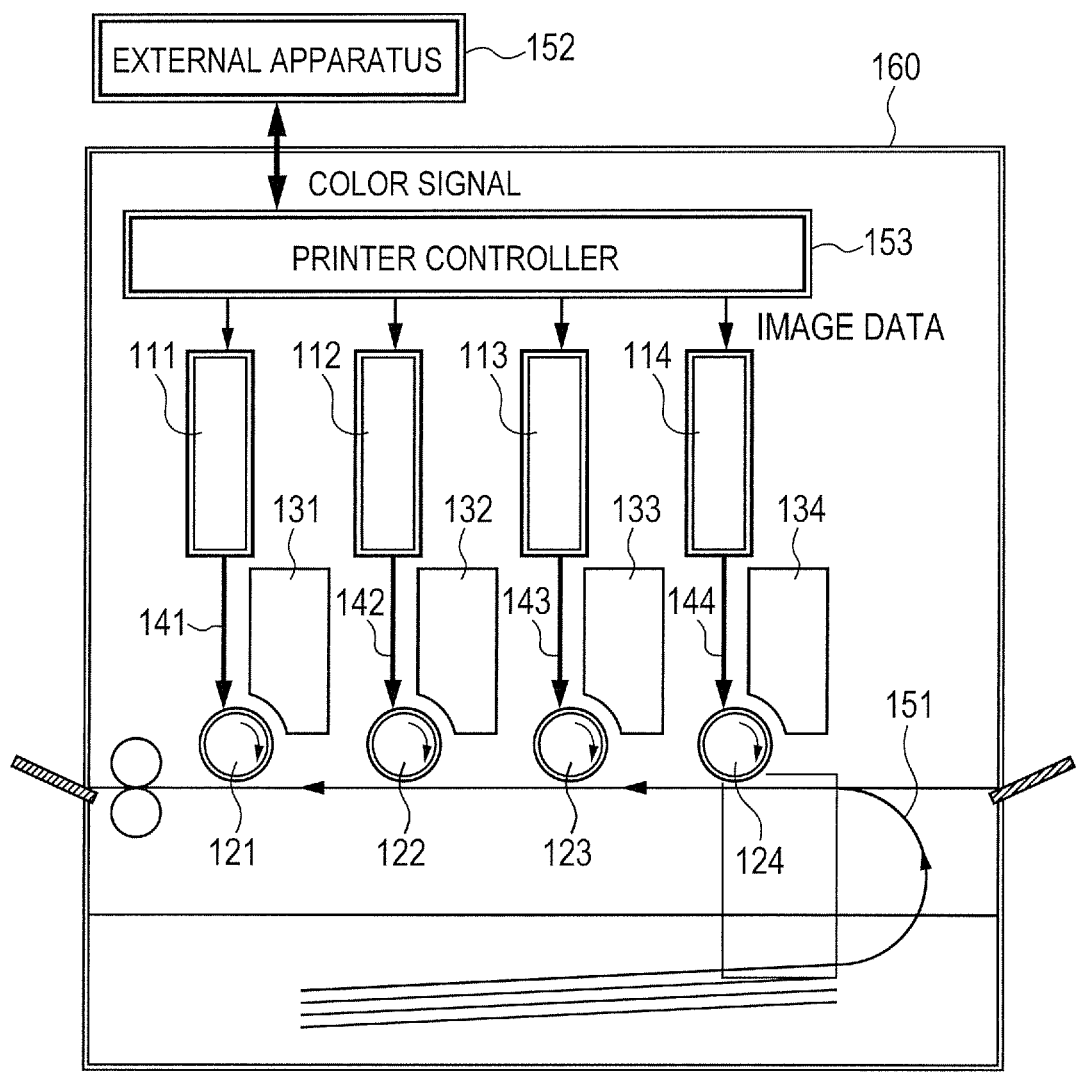
FIG. 25 is a cross-sectional view of main parts of a color image forming apparatus including an optical scanning apparatus according to an embodiment of the present invention in the sub-scanning direction.

FIG. 25 is a schematic cross-sectional view of main parts, in a sub-scanning direction, of a color image forming apparatus including an optical scanning apparatus according to an embodiment of the present invention. A color image forming apparatus 160 includes optical scanning apparatus 111, 112, 113 and 114 and photosensitive drums 121, 122, 123 and 124 each functioning as an image bearing member. The optical scanning apparatus 111, 112, 113 and 114 are configured to use a single polygon mirror as a deflector, so that light from the optical scanning apparatus 111, 112, 113 and 114 respectively enters different deflecting surfaces (mirror surfaces) adjacent to each other from an upper side and a lower side at oblique angles and the reflected light is guided to the respective photosensitive drums.

The color image forming apparatus 160 further includes developing units 131, 132, 133 and 134 and a conveyor belt 151. In FIG. 25, respective color signals of red (R), green (G) and blue (B) are input from an external apparatus 152 such as a personal computer to the color image forming apparatus 160. The code data input from the external apparatus 152 is converted into respective image signals (dot data) of cyan (C), magenta (M), yellow (Y) and black (B) by a printer controller 153 in the color image forming apparatus. The respective image signals are input to the optical scanning apparatus 111, 112, 113 and 114.

Then, light beams 141, 142, 143 and 144, which are modulated in accordance with the respective pieces of image data, are emitted from these optical scanning apparatus. Photosensitive surfaces of the photosensitive drums 121, 122, 123 and 124 are scanned with the light beams in a main scanning direction. In the color image forming apparatus of this embodiment, the optical scanning apparatus emit rays through the single polygon mirror as described above, corresponding to the respective colors of cyan (C), magenta (M), yellow (Y) and black (B).

With this, the color image forming apparatus uses the light beams which are respectively based on image data to form electrostatic latent images of four colors on the surfaces of the photosensitive drums 121, 122, 123 and 124 respectively corresponding to the four colors. Then, toner is adhered as a developer to the electrostatic latent images so as to be developed into toner images, and the developed toner images are then transferred in a manner of being superimposed by a transferring unit to a transfer material. Then, the transfer material onto which the toner image has been transferred is heated and pressed by a fixing unit so that the toner image is fixed by heat, and then is delivered outside of the main body by a delivery roller (not shown). By the process described above, one full color image is formed.

The external apparatus 152 may be a color image reading device including, for example, a CCD sensor. In this case, the color image reading apparatus and the color image forming apparatus 160 constitute a color digital copying machine.

Optical Scanning Apparatus

1) Definition

In the following description, an arrangement reference plane is a plane perpendicular to the rotation axis of the deflector and including the center of the deflecting surface of the deflector in the sub-scanning direction. The main scanning direction is a direction (direction in which the light beam is reflected for deflection (deflected for scanning) at the deflector) perpendicular to the rotation axis of the deflector and the optical axis direction of the imaging optical system (fθ lens system). The sub-scanning direction is a direction parallel to the rotation axis of the deflector, i.e., a direction perpendicular to the main scanning direction and the optical axis direction of the imaging optical system. The main scanning section is a cross section including the optical axis direction of the imaging optical system and the main scanning direction, and the sub-scanning section is a cross section perpendicular to the main scanning section.

2) Overall Configuration

Figure 2:
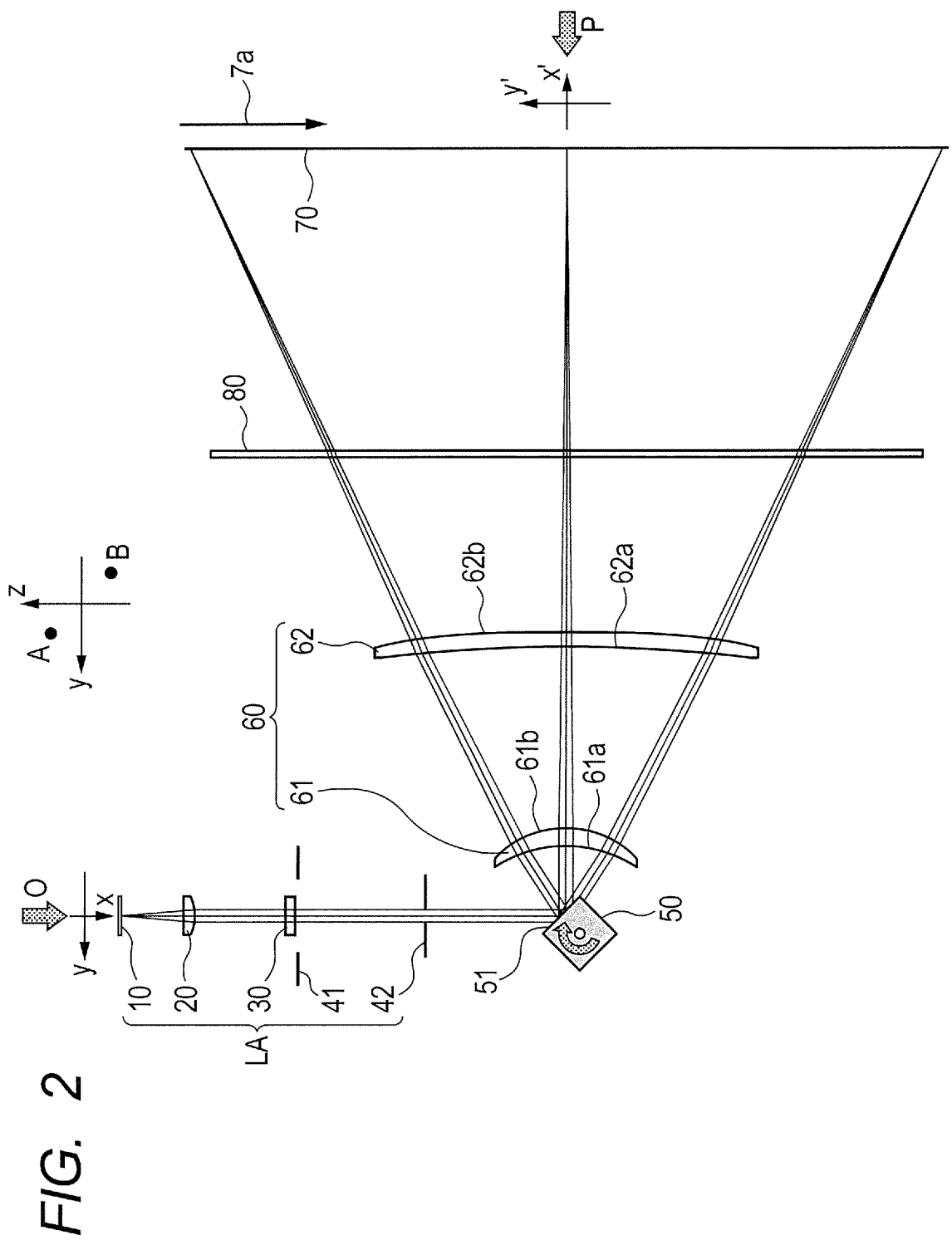
FIG. 2 is a cross-sectional view of main parts of the optical scanning apparatus according to a first embodiment of the present invention in a main scanning direction.
Figure 3:
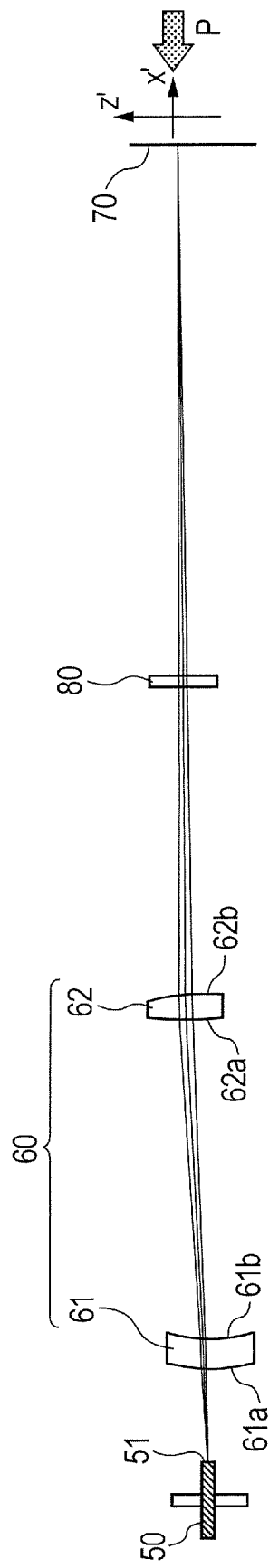
FIG. 3 is a cross-sectional view of the main parts of the optical scanning apparatus according to the first embodiment in the sub-scanning direction from a deflecting surface to a surface to be scanned.
Figure 4:
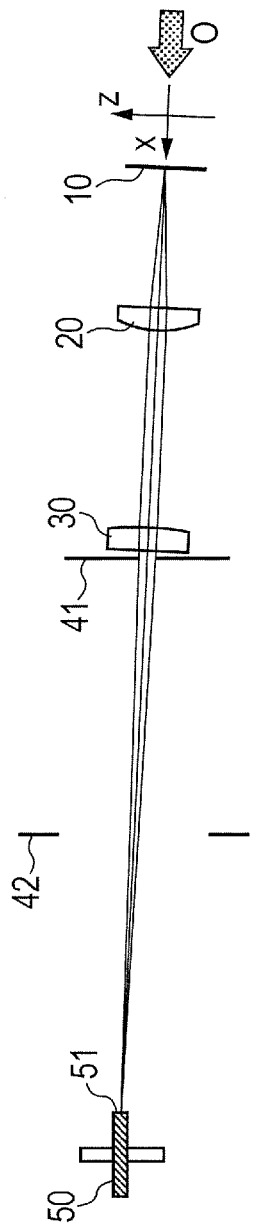
FIG. 4 is a cross-sectional view of the main parts of the optical scanning apparatus according to the first embodiment in the sub-scanning direction from a light emitting part to the deflecting surface.

FIG. 2 is a cross-sectional view of a multi-beam optical scanning apparatus according to a first embodiment of the present invention in the main scanning direction. FIGS. 3 and 4 are cross-sectional views of the multi-beam optical scanning apparatus according to the first embodiment in the sub-scanning direction. FIG. 3 is a cross-sectional view of an imaging optical system 60 as a second optical system from a deflecting surface 51 of a rotary polygon mirror 50 that is a deflector to a surface 70 to be scanned in the sub-scanning direction. FIG. 4 is a cross-sectional view of an incident optical system LA as a first optical system from two light emitting parts (light emitting points) A and B of a light source 10 to the deflecting surface 51 in the sub-scanning direction.

The optical scanning apparatus according to the first embodiment is a multi-beam optical scanning apparatus employing an "oblique incident optical system" that causes the light beams to enter a plane perpendicular to the rotation axis of a deflecting surface of the deflector in a direction with an oblique angle with respect to the sub-scanning section for scanning a plurality of surfaces to be scanned with a single deflector to downsize the apparatus.

3) Multi-Beam Light Source and Incident Optical System

In FIGS. 2 and 4, the light source 10 includes a monolithic multi-semiconductor laser (multi-beam light source) including two light emitting parts A and B. Two light beams respectively emitted from the two light emitting parts A and B are converted into substantially collimated light beams by a collimator lens 20, then enter a cylindrical lens 30, and are refracted only in the sub-scanning direction. After that, widths of the light beams are limited in the sub-scanning direction by a first aperture stop 41. The widths of the light beams are then limited in the main scanning direction by a second aperture stop 42 and focused only in the sub-scanning direction on a vicinity of the deflecting surface of the rotary polygon mirror 50, so that an elongated line image is formed in the main scanning direction.

The collimator lens 20, the cylindrical lens 30, the first aperture stop 41 and the second aperture stop 42 constitute one part of the incident optical system LA. Although the light beams are converted into the substantially collimated light beams by the collimator lens 20 in the first embodiment, optical elements respectively for converting the light beams into diverging light beams with weakened divergence and for converting the diverging light beams into converging light beams can be used instead of the collimator lens 20. Further, not only the two lenses, but also a single anamorphic optical element having a power different between the main scanning direction and the sub-scanning direction can be used.

As illustrated in FIG. 4, the optical axis of the incident optical system LA is inclined in the sub-scanning direction with respect to the arrangement reference plane that is a plane perpendicular to the rotation axis of the rotary polygon mirror 50. The incident optical system LA causes the light beams emitted from the light source 10 to obliquely enter the arrangement reference plane perpendicular to the rotation axis of the rotary polygon mirror 50 at a predetermined angle (3° in the first embodiment) in the sub-scanning direction from the lower side (the oblique incident optical system). The two light beams reflected for deflection toward the upward side of the arrangement reference plane by the rotary polygon mirror 50 are focused on the surface 70 to be scanned by the imaging optical system 60 formed of a first fθ lens 61 and a second fθ lens 62, so that each of the light beams forms an optical spot image on the surface 70 to be scanned.

By the rotary polygon mirror 50 rotating in a direction of an arrow in FIG. 2, each optical spot scans the surface 70 to be scanned in a direction of an arrow 7a in FIG. 2 to form an electrostatic latent image. The surface 70 to be scanned includes, for example, a photosensitive drum.

Figure 5:
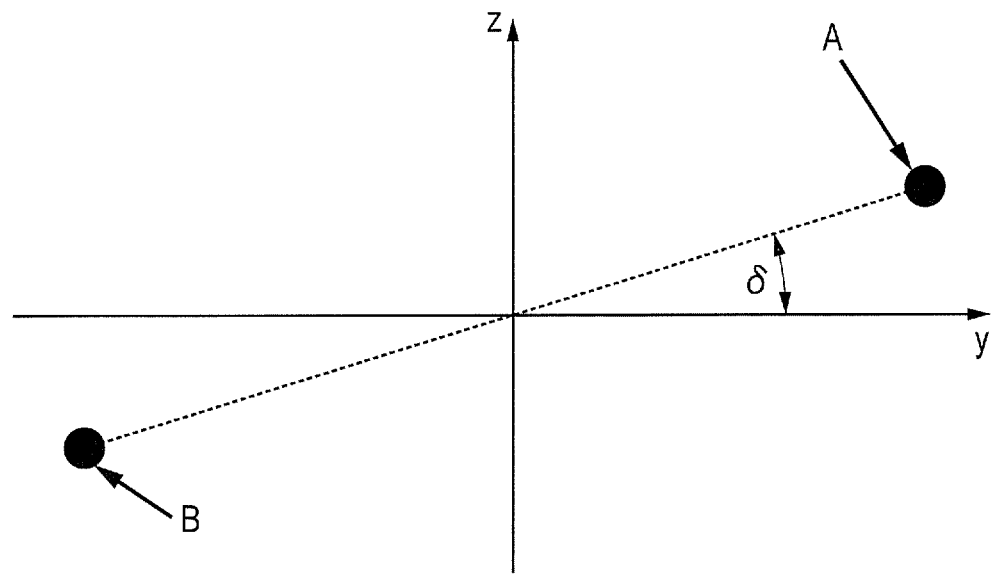
FIG. 5 is a diagram illustrating an arrangement of two light emitting parts according to the first embodiment.

The two light emitting parts A and B of the light source 10 are separated from each other by 90 μm, and therefore, if the two light emitting parts A and B are arranged longitudinally along the sub-scanning direction, a scanning line interval (pitch) on the surface 70 to be scanned in the sub-scanning direction becomes much larger than a desired interval determined from a recording density. For this reason, when the main scanning direction is taken as the y axis, a direction along which the light beams from the light source 10 travel (a direction parallel to the optical axis of the collimator lens 20 and along which the light beams travel) is taken as the x axis, and a direction perpendicular to the x axis and the y axis is taken as the z axis, the two light emitting parts A and B are arranged as illustrated in FIG. 5 when viewed from a direction of an arrow O in FIG. 2.

By arranging the two light emitting parts A and B in an inclined manner and adjusting an inclined angle δ, the scanning line interval in the sub-scanning direction is accurately adjusted on the surface 70 to be scanned to conform to the recording density. In this embodiment, the angle δ is adjusted to conform the scanning line interval for a resolution of 600 dpi (25.4/600=42.33 μm), so that its value is 3.85°. Therefore, the two light emitting parts A and B are separated from each other not only in the sub-scanning direction but also in the main scanning direction.

Figure 6:
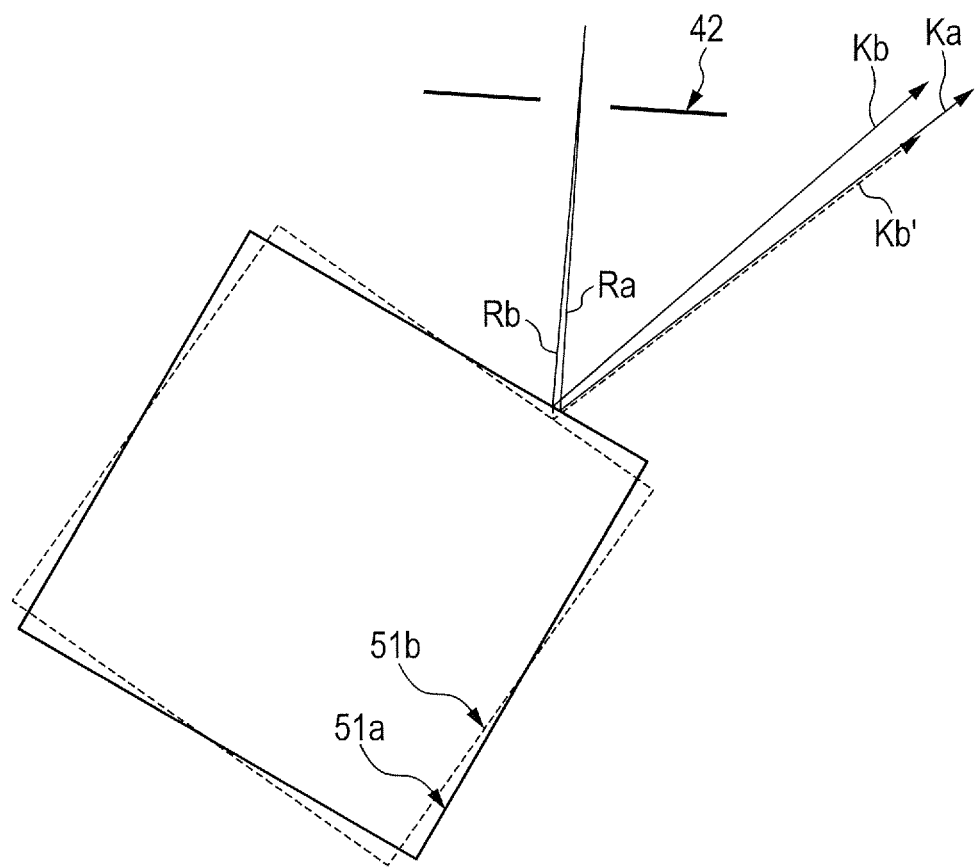
FIG. 6 is a cross-sectional view in the main scanning direction illustrating reflections of two light beams at the deflecting surface according to the first embodiment.

FIG. 6 is a cross-sectional view in the main scanning direction illustrating reflections of principal rays of the two light beams at the deflecting surface 51 when scanning at a scanning start side in FIG. 2 (the upper side in FIG. 2). First, a light beam Ra emitted from the light emitting part A (not shown) is reflected at a deflecting surface 51a (indicated by a solid line) in a direction Ka and focused on the surface 70 to be scanned (not shown) by the imaging optical system 60 (not shown) located in a right direction in FIG. 6. A light beam Rb emitted from the light emitting part B (not shown) is reflected at the same timing at the deflecting surface 51a (indicated by the solid line) in a direction Kb and focused on the surface 70 to be scanned (not shown) by the imaging optical system 60 (not shown) located in the right direction in FIG. 6.

The two light beams Ra and Rb having been reflected at the deflecting surface 51a (indicated by the solid line) at the same timing are reflected in the directions Ka and Kb different from each other. Therefore, the two light beams Ra and Rb respectively emitted from the two light emitting parts A and B are focused on positions separated from each other in the main scanning direction on the surface 70 to be scanned. For this reason, image data is sent when the timing is shifted by a predetermined time δT so that a focusing position of the light beam Rb that scans later on the surface 70 to be scanned in the main scanning direction is aligned at a focusing position of the light beam Ra that scans earlier (the deflecting surface at this time is indicated by a dashed line as a deflecting surface 51b).

When the timing is shifted in the above-mentioned manner, the light beam Rb emitted from the light emitting part B and reflected at the deflecting surface 51b is reflected in a direction Kb' (the same direction as the direction Ka) and focused on the same position as that of the light beam Ra that scans earlier on the surface 70 to be scanned in the main scanning direction.

Figure 7:
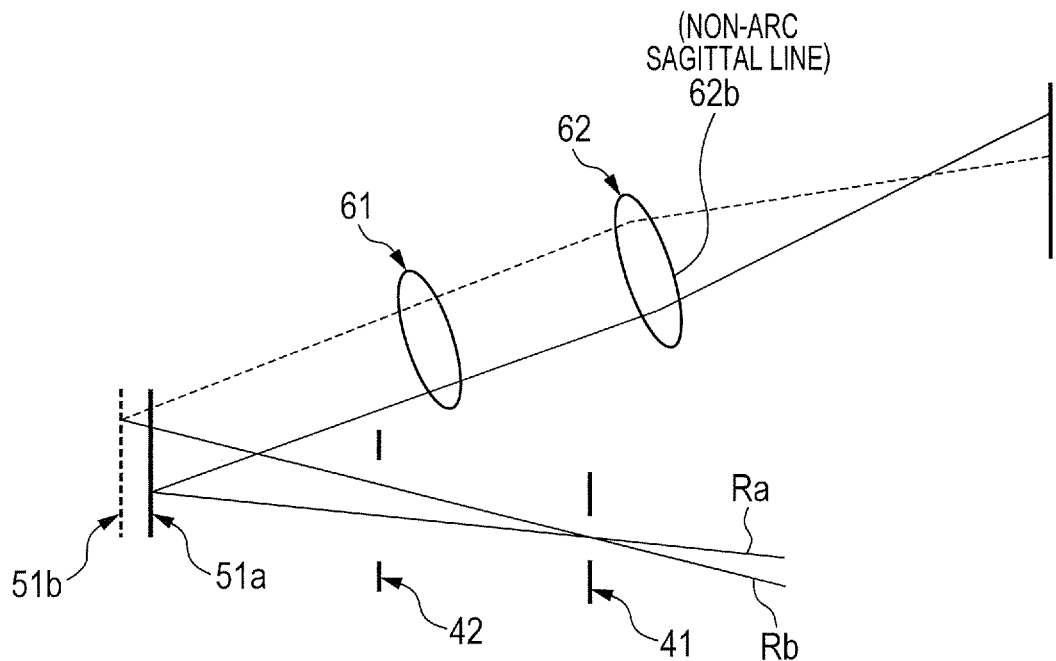
FIG. 7 is a cross-sectional view in the sub-scanning direction illustrating the reflections of the two light beams at the deflecting surface according to the first embodiment.
Figure 8:
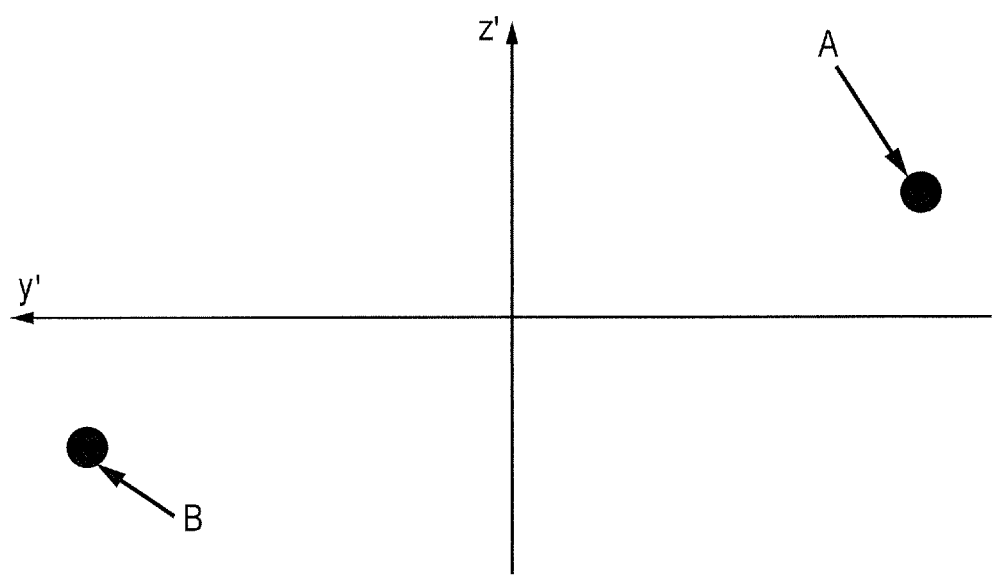
FIG. 8 is a diagram illustrating spot imaging positions of the two light beams on the surface to be scanned according to the first embodiment.

FIG. 7 is a cross-sectional view in the sub-scanning direction illustrating the reflections of the principal rays of the two light beams at the deflecting surface 51 when scanning at the scanning start side in FIG. 2 (the upper side in FIG. 2). As is clear from FIG. 7, of the principal rays Ra and Rb of the two light beams respectively emitted from the two light emitting parts A and B, the principal ray Ra arrives at the upper side in the sub-scanning direction than the principal ray Rb on the surface 70 to be scanned. Therefore, when the surface to be scanned is viewed from an arrow P side in FIGS. 2 and 3, a positional relationship between the spots at which the two light beams deflected by the deflecting surface 51 are focused on the surface 70 to be scanned at a certain time is as illustrated in FIG. 8.

Timing of the image data for the light emitting part B is shifted by the predetermined time δT so that a position of the light beam emitted from the light emitting part B on the surface 70 to be scanned in the main scanning direction is aligned at a position of the light beam emitted from the light emitting part A on the surface 70 to be scanned in the main scanning direction. In FIGS. 2 and 3, a dustproof glass 80 is provided to prevent dust or toner from entering into the optical scanning apparatus. In this case, the imaging optical system 60 has a conjugate relationship, within the sub-scanning section, between an imaging position (focusing line position) at the time when an image is formed near the deflecting surface 51 by the cylindrical lens 30 and the surface 70 to be scanned, thus constituting a so-called "tangle error correcting optical system".

The characteristics of the optical system according to the first embodiment are shown in Table 1. In Table 1, "E-x" means "$10^{-x}$". Further, all coefficients not particularly mentioned are zero.

TABLE 1

| Configuration of incident optical system/ Arrangement of imaging optical system | | | | | Data on lens surface of imaging optical system | | | |
|---|---|---|---|---|---|---|---|---|
| | | | | | First fθ lens | | Second fθ lens | |
| | | | | | 61a surface | 61b surface | 62a surface | 62b surface |
| Wavelength of light source | λ (nm) | 790 | | | | | | |
| Number of light emitting points | n | 2 | | | | | | |
| Thickness of laser cover glass | dog (mm) | 0.25000 | Meridional line | R | −3.47152E+01 | −2.58903E+01 | −5.00000E+02 | 4.40776E+03 |
| Refractive index of laser cover glass | n0 | 1.51052 | | K | 2.38257E−01 | −7.67505E−01 | 0.00000E+00 | 1.72444E+01 |
| Light emitting point - First surface of collimator lens | d0 (mm) | 18.30500 | | B2 | 0.00000E+00 | 0.00000E+00 | 0.00000E+00 | 0.00000E+00 |
| Curvature radius of first surface of collimator lens | R1 (mm) | ∞ | | B4 | 1.85108E−07 | −2.77170E−06 | 0.00000E+00 | −7.94656E−07 |
| Curvature radius of second surface of collimator lens | R2 (mm) | −15.21639 | | B6 | 4.83447E−08 | 1.81844E−08 | 0.00000E+00 | 1.75850E−10 |
| Thickness of collimator lens | d1 (mm) | 3.00000 | | B8 | −1.81673E−10 | −3.05385E−11 | 0.00000E+00 | −3.62924E−14 |
| Refractive index of collimator lens | n1 | 1.76167 | | B10 | 1.99164E−13 | −3.19200E−14 | 0.00000E+00 | 3.95244E−18 |
| Second surface of collimator lens - First surface of cylindrical lens | d2 (mm) | 25.57500 | | B12 | 0.00000E+00 | 0.00000E+00 | 0.00000E+00 | 0.00000E+00 |
| Curvature radius in sub-scanning direction of first surface of cylindrical lens | Rs3 (mm) | 41.03107 | Sagittal line | r | 2.50000E+01 | 2.50000E+01 | 6.77042E+01 | −3.96920E+01 |
| Curvature radius in main scanning direction of first surface of cylindrical lens | Rm3 (mm) | ∞ | | k | 0.00000E+00 | 0.00000E+00 | 0.00000E+00 | 0.00000E+00 |
| Curvature radius in sub-scanning direction of second surface of cylindrical lens | Rs4 (mm) | ∞ | | D2u | 0.00000E+00 | −4.15046E−04 | 0.00000E+00 | 1.93647E−04 |
| Curvature radius in main scanning direction of second surface of cylindrical lens | Rm4 (mm) | ∞ | | D4u | 0.00000E+00 | 1.15992E−06 | 0.00000E+00 | −2.88008E−08 |
| Thickness of cylindrical lens | d3 (mm) | 3.00000 | | D6u | 0.00000E+00 | −2.21105E−09 | 0.00000E+00 | −2.42773E−12 |
| Refractive index of cylindrical lens | n2 | 1.52397 | | D8u | 0.00000E+00 | 5.93772E−12 | 0.00000E+00 | 7.51862E−15 |
| Second surface of cylindrical lens - First aperture stop | d4 (mm) | 0.90400 | | D10u | 0.00000E+00 | −1.06463E−15 | 0.00000E+00 | −1.88312E−18 |
| First aperture stop - Second aperture stop | d5 (mm) | 35.94600 | Sagittal line | D2l | 0.00000E+00 | −6.10821E−05 | 0.00000E+00 | 2.00919E−04 |
| Second aperture stop - Deflecting surface on axis | d6 (mm) | 40.00000 | | D4l | 0.00000E+00 | 1.79288E−06 | 0.00000E+00 | −8.97607E−09 |

TABLE 1-continued

| Configuration of incident optical system/ Arrangement of imaging optical system | | | | Data on lens surface of imaging optical system | | | |
|---|---|---|---|---|---|---|---|
| | | | | First fθ lens | | Second fθ lens | |
| | | | | 61a surface | 61b surface | 62a surface | 62b surface |
| Deflecting surface on axis - Lens surface 61a | d7 (mm) | 20.00000 | | D6I | 0.00000E+00 | −1.16500E−08 | 0.00000E+00 | −3.56175E−11 |
| Thickness of first fθ lens (61a-61b) | d8 (mm) | 5.00000 | | D8I | 0.00000E+00 | 2.65394E−11 | 0.00000E+00 | 3.08916E−14 |
| Refractive index of first fθ lens | n3 | 1.52397 | | D10I | 0.00000E+00 | −1.75853E−15 | 0.00000E+00 | −7.67333E−18 |
| Lens surface 61b - Lens surface 62a | d9 (mm) | 51.50000 | | G0.1 | | | 5.94719E−03 | −9.10000E−02 |
| Thickness of second fθ lens (62a-62b) | d10 (mm) | 4.00000 | | G1.1 | | | 5.33126E−05 | 4.19533E−05 |
| Refractive index of second fθ lens | n4 | 1.52397 | | G2.1 | | | 3.66915E−05 | 4.63618E−05 |
| Lens surface 62b - First surface of dustproof glass | d11 (mm) | 49.62080 | | G3.1 | | | 3.17055E−07 | 2.63210E−07 |
| Thickness of dustproof glass | d12 (mm) | 1.80000 | | G4.1 | | | −4.24586E−08 | −4.31205E−08 |
| Refractive index of dustproof glass | n5 | 1.51052 | | G5.1 | | | 6.80412E−11 | 6.03398E−11 |
| Second surface of dustproof glass - Surface to be scanned | d13 (mm) | 85.28920 | | G6.1 | | | 2.46411E−11 | 2.50770E−11 |
| Incident angle in main scanning direction of rotary polygon mirror of incident optical system | α | 89.50000 | | G7.1 | | | −2.30299E−13 | −1.56085E−13 |
| Incident angle in sub-scanning direction of rotary polygon mirror of incident optical system | β | 3.00000 | | G8.1 | | | −4.17407E−15 | −6.56057E−15 |
| Effective scanning angle | γ | ±32.437292 | | G9.1 | | | 1.13831E−16 | 6.12653E−17 |
| Number of mirror surfaces of rotary polygon mirror | men | 4 | | G10.1 | | | −1.84777E−18 | 3.53900E−20 |
| Radius of circumscribing circle of rotary polygon mirror | RpoI | 10.00000 | | G11.1 | | | −1.44376E−20 | −1.16976E−21 |
| Aperture stop diameter (second aperture stop × first aperture stop) | rectangular (mm) | 3.63 × 2.16 | Sagittal line | G12.1 | | | 5.54400E−22 | 1.42449E−22 |
| | | | | G13.1 | | | −1.28014E−24 | −2.16454E−24 |
| | | | | G0.4 | | | | −3.25056E−05 |
| | | | | G1.4 | | | | 3.90324E−07 |
| | | | | G2.4 | | | | 1.80524E−08 |
| | | | | G3.4 | | | | 2.94091E−10 |
| | | | | G4.4 | | | | 8.75123E−12 |
| | | | | G5.4 | | | | −1.55063E−13 |
| | | | | G6.4 | | | | −3.92266E−15 |

\* Refractive index is a value at the wavelength of 790 nm

Each of lens surfaces 61a to 62b of the first fθ lens 61 and the second fθ lens 62 constituting the imaging optical system 60 has the following meridional line shape (a shape within the main scanning section) with an intersect of each lens surface and the optical axis (a vertex of the lens surface) as the origin. That is, when the optical axis direction is taken as the X axis, an axis perpendicular to the optical axis in the main scanning direction is taken as the Y axis, and an axis perpendicular to the optical axis in the sub-scanning direction is taken as the Z axis, the meridional line shape is defined by the following Equation (1). R represents a curvature radius, K represents the eccentricity, and $B_4$ to $B_{12}$ represent aspheric coefficients of the 4th- to 12th-order meridional lines.

$$X = \frac{\frac{Y^2}{R}}{1+\sqrt{1-(1+K)\left(\frac{Y}{R}\right)^2}} + \sum_{i=2}^{6} B_{2i} Y^{2i} \quad (1)$$

Here, if the coefficient is different between a positive side (on the side of the light source 10, on the upper side in FIG. 2) and a negative side (on the side without the light source 10, on the lower side in FIG. 2) of the Y axis, a suffix u is added to a coefficient on the positive side while a suffix 1 is added to a coefficient on the negative side.

A sagittal line shape (a shape within the sub-scanning section) of each of the lens surfaces 61a to 62b of the first fθ lens 61 and the second fθ lens 62 is defined by the following Equation (2).

$$S = \frac{\frac{Z^2}{r'}}{1 + \sqrt{1 - (1+k)\left(\frac{Z}{r'}\right)^2}} + \sum_{k=1}^{16} \sum_{j=0}^{16} G_{jk} Y^j Z^k, \quad (2)$$

$$r' = r\left(1 + \sum_{i=2}^{10} D_i Y^i\right)$$

Here, r' represents a curvature radius in the sagittal line, which varies in accordance with a position in the main scanning direction with respect to a curvature radius r in the sagittal line on the optical axis (Y=0), and $D_2$ to $D_{10}$ represent variation coefficients of the curvature radius in the sagittal line. Here, if the coefficient is different between the positive side and the negative side of the Y axis, a suffix u is added to a coefficient on the positive side while a suffix 1 is added to a coefficient on the negative side. $G_{jk}Y_j$ is a kth-order aspheric coefficient of the sagittal line. The aspheric coefficient of the sagittal line varies in accordance with a position in the main scanning direction. In the first embodiment, the lens surfaces 62a and 62b of the second fθ lens 62 have a first-order aspheric coefficient term of Z, defining a tilt varying surface where a tilt amount in the sub-scanning direction of the lens surface varies in accordance with the position in the main scanning direction.

The lens surface 62b of the second fθ lens 62 on the surface 70 to be scanned side further has a fourth-order aspheric coefficient term of Z, to thereby correct an uneven pitch due to a tangle of the deflecting surface of the rotary polygon mirror 50. In addition, a curvature radius r' of the sagittal line varies in an asymmetric manner in the main scanning direction, causing the magnification in the sub-scanning direction (imaging magnification in the sub-scanning direction) of the imaging optical system 60 between the deflecting surface and the surface 70 to be scanned to vary in an asymmetric manner in the main scanning direction. With this configuration, the non-uniformity of the scanning line interval in the sub-scanning direction on the surface 70 to be scanned is reduced. In the first embodiment, the second fθ lens 62 is arranged in an eccentric manner by 4.348 mm in the sub-scanning direction.

4) Reduction of Non-Uniformity of Scanning Line Interval in Sub-Scanning Direction A method of reducing the non-uniformity of the scanning line interval in the sub-scanning direction according to this embodiment is described in detail below.

Geometric Optics Interval of Scanning Line

Figure 1A:
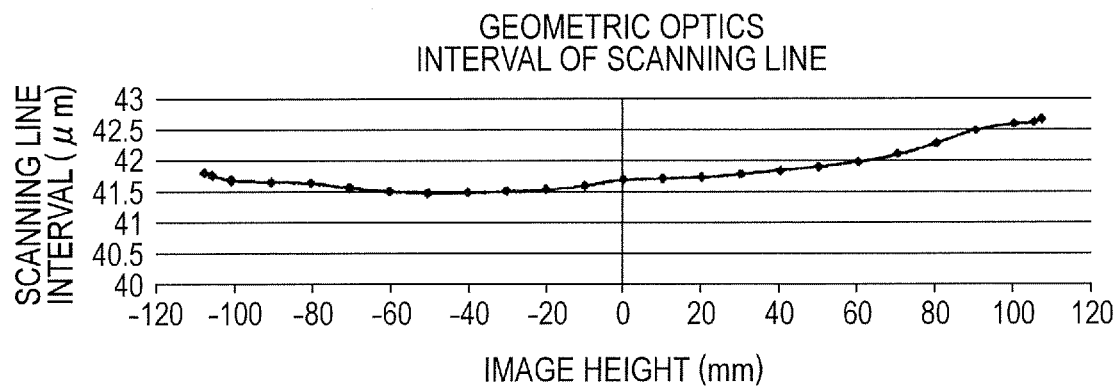
FIG. 1A is a graph of an optical characteristic diagram of an optical scanning apparatus according to one embodiment of the present invention, showing a geometric optics interval of the scanning line.

A (geometric-optical) scanning line interval in the sub-scanning direction based on the position of the principal ray on the surface to be scanned is shown in FIG. 1A. The horizontal axis represents a scanning image height (mm) on the surface 70 to be scanned, where the positive side (the right side in the graph) is the scanning start side (corresponding to the upper side in FIG. 2) and the negative side (the left side in the graph) is the scanning end side (corresponding to the lower side in FIG. 2). This scanning line interval indicates an interval in the sub-scanning direction when the light beam Ra emitted from the light emitting part A on a side where the spot image appears earlier in the main scanning direction and the light beam Rb emitted from the light emitting part B on a side where the spot image appears later in the main scanning direction scan the surface to be scanned. In FIG. 1A, the scanning line interval in the sub-scanning direction is larger on the scanning start side (the right side in the graph) and smaller on the scanning end side (the left side in the graph). This can be understood in the following manner.

At a time when the light beam Ra emitted from the light emitting part A that travels earlier in the main scanning direction is located at a scanning start position, the light beam Rb emitted from the light emitting part B that travels later in the main scanning direction is located at a position before the scanning start position. When a time from when the light beam Rb is located at the position before the scanning start position until the light beam Rb arrives at the scanning start position has elapsed, because the deflecting surface of the polygon mirror rotates (FIG. 6), the position at which the light beam Rb is focused by the fθ lens system is shifted in the sub-scanning direction so that the scanning line interval is increased (FIG. 7).

Further, at a time when the light beam Ra emitted from the light emitting part A that travels earlier arrives at a scanning end position, the light beam Rb emitted from the light emitting part B that travels later is located at a position before the scanning end position. When a time from when the light beam Rb is located at the position before the scanning end position until the light beam Rb arrives at the scanning end position has elapsed, because the deflecting surface of the polygon mirror rotates, the position at which the light beam Rb is focused by the fθ lens is shifted in the sub-scanning direction so that the scanning line interval is decreased.

Figure 1B:
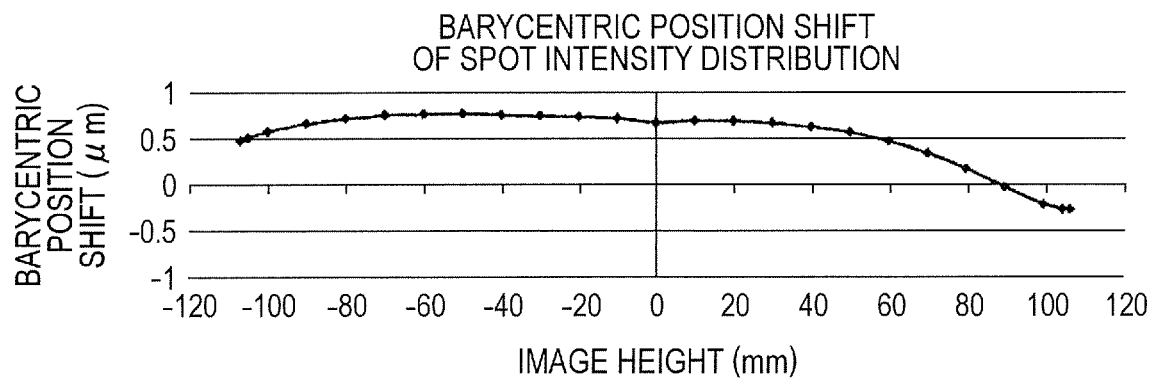
FIG. 1B is a graph of an optical characteristic diagram of the optical scanning apparatus according to one embodiment of the present invention, showing a barycentric position shift of a spot intensity distribution.

Wave Optics Interval of Scanning Line with Respect to Geometric Optics Interval of Scanning Line The non-uniformity of the geometric optics interval of the scanning line shown in FIG. 1A occurs because the optical scanning apparatus is an oblique incident optical system. In the case of the oblique incident optical system, even if the non-uniformity of the geometric optics interval of the scanning line is reduced, as shown in FIG. 1B, a barycentric position shift of a spot intensity distribution (a sum of shift amounts of barycentric positions of spots with respect to a position of each principal ray on the surface to be scanned) still remains, and therefore, the wave optics interval of the scanning line is not to be uniform.

Obtaining Uniform Wave Optics Interval of Scanning Line

In this embodiment, in the fθ lens having the non-arc sagittal line shape, a magnitude characteristic in accordance with a position of the shift of the geometric optics interval of the scanning line in the main scanning direction is reversed with respect to a magnitude characteristic in accordance with a position (image height) of the barycentric position shift of the spot image in the main scanning direction. With this configuration, it is possible to align the wave optics interval of the scanning line that is a sum of both characteristics (preferably, to obtain the uniform wave optics interval of the scanning line). When a sufficient uniformity cannot be obtained, an adjustment is made with the magnitude of the magnification in the sub-scanning direction to obtain a sufficient uniformity.

FIG. 1A shows a characteristic that the scanning line interval (geometric optics interval of the scanning line) as an interval in the sub-scanning direction at the principal ray arriving position on the surface 70 to be scanned of the two light beams Ra and Rb is larger on the scanning start side (the right side in the graph) and smaller on the scanning end side (the left side in the graph) as described above. FIG. 1B shows a characteristic of a barycentric position shift of the spot intensity distribution when the spot images are formed by the two light beams Ra and Rb focused on the surface 70 to be scanned, which occur because the sagittal line of the lens surface 62b is a non-arc shape. The characteristic shown in FIG. 1A is obtained by varying the magnification in the sub-scanning direction of the fθ lens to be asymmetric in the main scanning direction and arranging the light source at a predetermined position as follows.

fθ Lens Having Non-Arc Sagittal Line Shape

Figure 12:
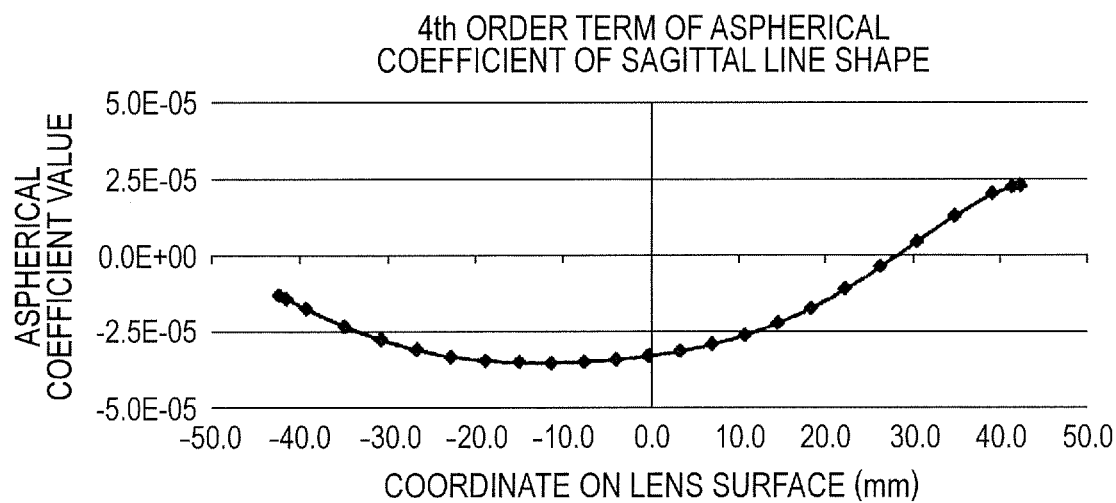
FIG. 12 is a graph showing an aspheric coefficient of the fourth-order term according to the first embodiment and the modified example.
Figure 13:
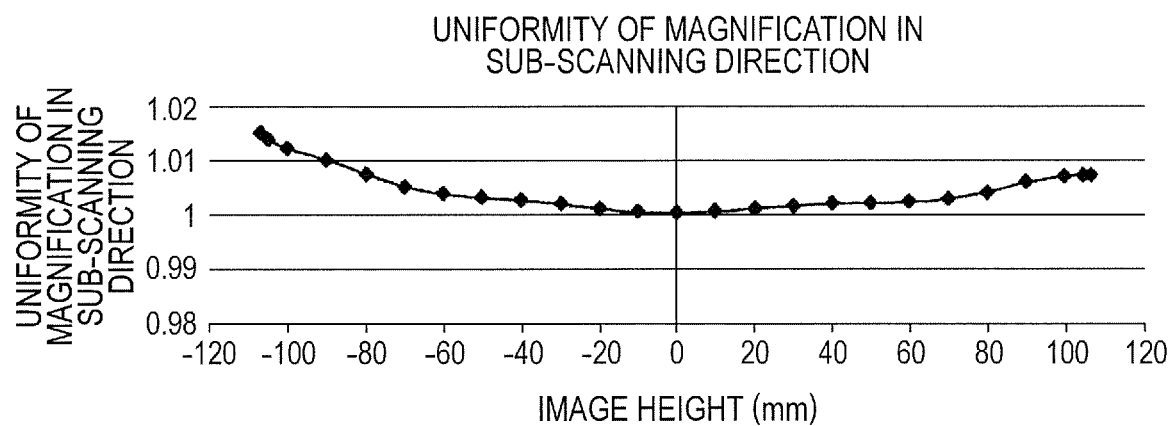
FIG. 13 is a graph showing a uniformity of a magnification in the sub-scanning direction according to the first embodiment.

Regarding FIG. 1B, the barycentric position shift of the spot intensity distribution depends on the non-arc shape of the sagittal line. As is clear from FIG. 7, the two light beams respectively emitted from the two light emitting parts A and B pass through positions separated from each other in the sub-scanning direction on the lens surface 62b that has the non-arc sagittal line shape. FIG. 12 shows a variation of the aspheric coefficient of the fourth-order term included in the sagittal line shape across the main scanning direction. The horizontal axis represents a coordinate in the main scanning direction on the lens surface 62b, where the positive side is the scanning start side (the upper side in FIG. 2) and the negative side is the scanning end side (the lower side in FIG. 2). As is clear from FIG. 12, the aspheric coefficient of the fourth-order term varies in an asymmetric manner in the main scanning direction, which is larger on the scanning start side than on the scanning end side. Further, the variation (function) of the aspheric coefficient of the fourth-order term across the main scanning direction in FIG. 12 has an extremum.

In an area where the aspheric coefficient of the fourth-order term included in the sagittal line is a positive value in FIG. 12 (an area where the power is decreased as being separated from the optical axis in the sub-scanning direction), the barycentric position shift of the spot intensity distribution in FIG. 1B occurs in the negative direction. On the contrary, in an area where the aspheric coefficient of the fourth-order term included in the sagittal line is a negative value (an area where the power is increased as being separated from the optical axis in the sub-scanning direction), the barycentric position shift of the spot intensity distribution in FIG. 1B occurs in the positive direction. The variation of the barycentric position shift of the spot intensity distribution shown in FIG. 1B also has an extremum, and varies in an asymmetric manner in the main scanning direction, having smaller values on the scanning start side (the right side in FIG. 1B) than on the scanning end side (the left side in FIG. 1B).

Reduction of Variation in Main Scanning Direction of Magnification in Sub-Scanning Direction by Arrangement of Light Source Regarding the arrangement of the plurality of light emitting parts of the light source, among the plurality of light emitting parts, the light emitting part A on a side where the spot image appears earlier in the main scanning direction is arranged on a side closer to the arrangement reference plane in the sub-scanning direction with respect to the light emitting part B on a side where the spot image appears later in the main scanning direction. With this arrangement, the variation of the magnification in the sub-scanning direction is reduced in the main scanning direction. As described earlier, with this arrangement, it is possible to cancel out the magnitude characteristic of the shift of the geometric optics interval of the scanning line (which is larger on the scanning start side and smaller on the scanning end side) and the magnitude characteristic of the barycentric position shift of the spot image (which is smaller on the scanning start side and larger on the scanning end side) with each other.

When there is a large variation of the magnification in the sub-scanning direction in the effective scanning area, a fluctuation of a spot diameter in the sub-scanning direction is increased, and therefore, the smaller variation of the magnification in the sub-scanning direction is desirable. In this first embodiment, in order to suppress the variation of the magnification in the sub-scanning direction of the imaging optical system 60 to as small an amount as required to obtain the uniform wave optics interval of the scanning line, the two light emitting parts A and B are arranged as illustrated in FIG. 5.

In this embodiment, the light emitting part A is taken as the light emitting part on the side where the spot image appears earlier in the main scanning direction. However, when the rotary polygon mirror 50 rotates in a direction opposite to the direction of the arrow in FIG. 2, the lower side in FIG. 2 becomes the scanning start side and the upper side in FIG. 2 becomes the scanning end side. In this case as well, the same effect can be obtained by arranging the plurality of light emitting parts of the light source as illustrated in FIG. 5. That is, the light emitting part A on the side where the spot image appears later in the main scanning direction is arranged on the side closer to the arrangement reference plane in the sub-scanning direction.

Therefore, a direction heading for a position where the light source 10 is located with respect to the arrangement reference plane (the plane perpendicular to the rotation axis of the deflecting surface 51 of the rotary polygon mirror 50 and including the center of the deflecting surface of the deflector in the sub-scanning direction) is defined as a negative direction in the sub-scanning direction.

Accordingly, a direction heading for the opposite side is defined as a positive direction in the sub-scanning direction. Of the light emitting parts A and B of which the light beams are deflected when the angle of the deflecting surface 51 is the same, the light emitting part B is arranged so that the position of the spot imaged by the light emitting part B on the surface 70 to be scanned is located closer to the side on which the light source is arranged in the main scanning direction. In the sub-scanning direction, the light emitting part B is arranged to be located farther in the negative direction in the sub-scanning direction with respect to the light emitting part A.

Comparative Example in which Light Source is Arranged in Opposite Manner

Figure 14:
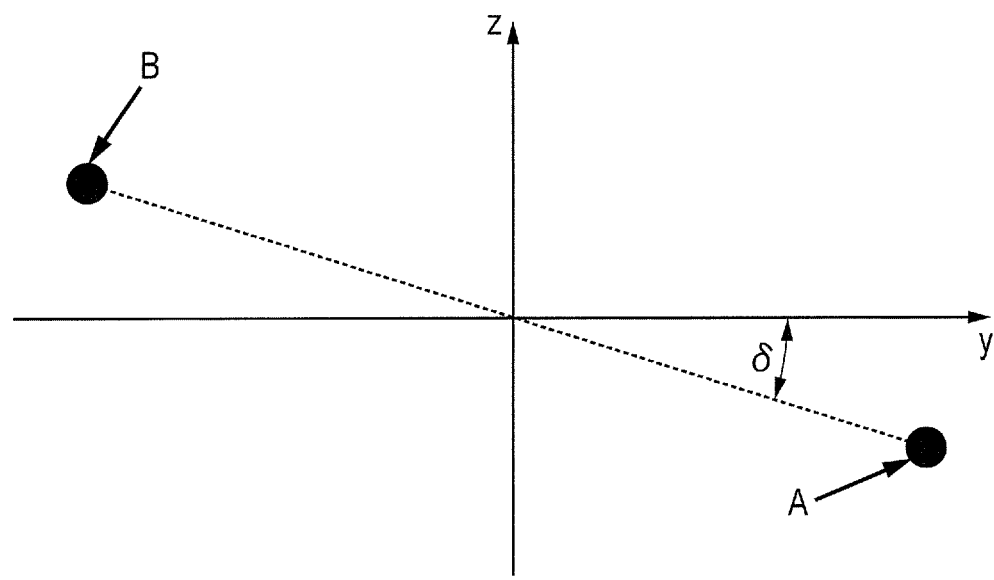
FIG. 14 is a diagram illustrating an arrangement of two light emitting parts according to a comparative example.
Figure 15:
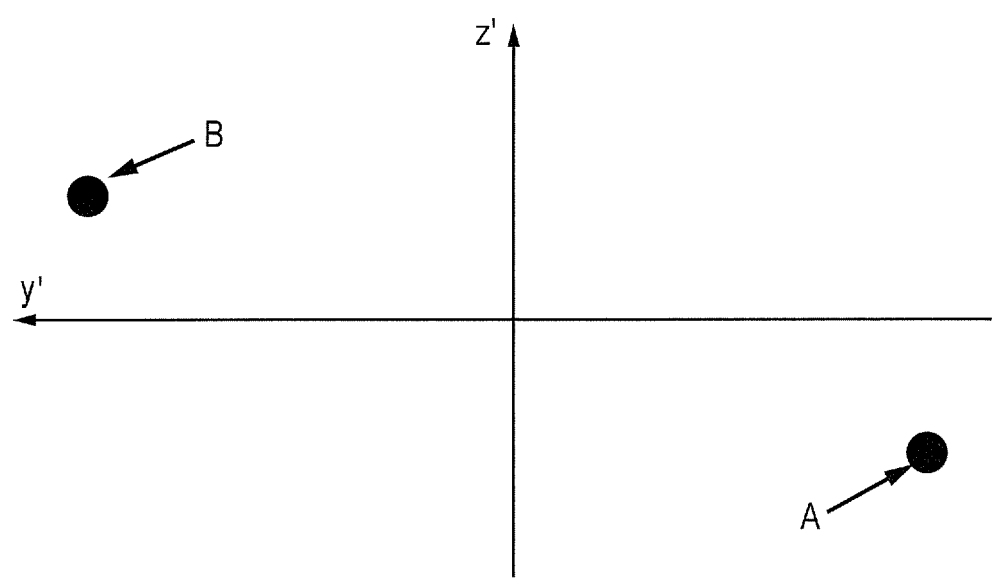
FIG. 15 is a diagram illustrating spot imaging positions of two light beams on a surface to be scanned according to the comparative example.
Figure 16A:
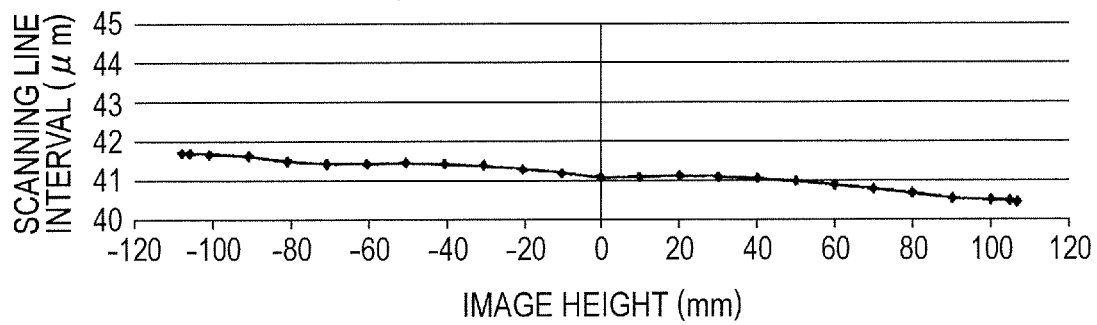
FIG. 16A is a graph of an optical characteristic according to the comparative example, showing a geometric optics interval of the scanning line.
Figure 16B:
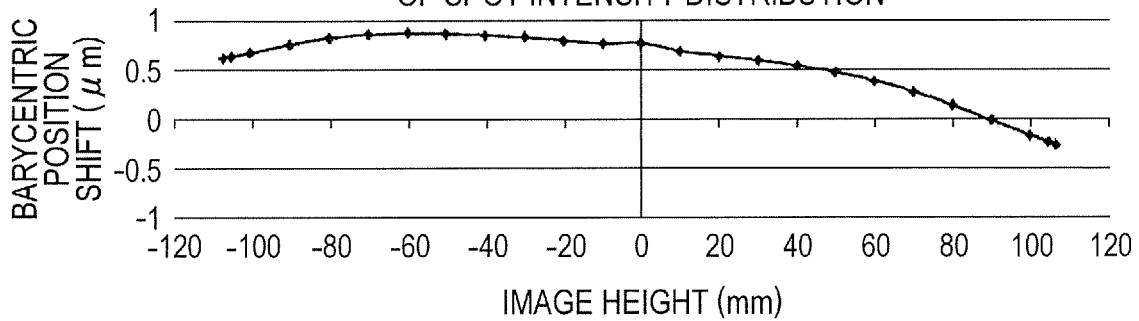
FIG. 16B is a graph of an optical characteristic according to the comparative example, showing a barycentric position shift of a spot intensity distribution.
Figure 16C:
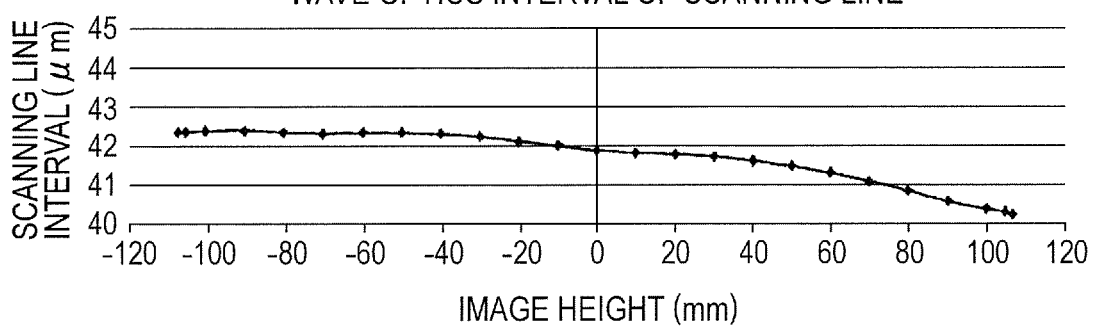
FIG. 16C is a graph of an optical characteristic according to the comparative example, showing a wave optics interval of the scanning line.

A comparative example in which the two light emitting parts A and B are arranged as illustrated in FIG. 14 is described. Other configurations of the comparative example are the same as those of the first embodiment except that the magnification in the sub-scanning direction is kept constant. FIG. 15 is a diagram illustrating a positional relationship between the spot imaging positions on the surface 70 to be scanned according to the comparative example. FIGS. 16A, 16B and 16C are graphs showing the scanning line interval in the sub-scanning direction according to the comparative example. In this case, the timing is shifted by the predetermined time δT so that the imaging position of the light beam Rb emitted from the light emitting part B is aligned at a position on the photosensitive drum where the light beam Ra emitted from the light emitting part A is focused.

FIGS. 16A, 16B and 16C show the scanning line interval in the sub-scanning direction when the light beam Ra emitted from the light emitting part A and the light beam Rb emitted from the light emitting part B scan the surface 70 to be scanned in this case. FIG. 16A shows the scanning line interval (geometric optics interval of the scanning line) as an interval in the sub-scanning direction of the principal ray arriving positions of the two light beams Ra and Rb on the surface 70 to be scanned. FIG. 16B shows a barycentric position shift of the spot intensity distribution when the two light beams Ra and Rb are focused as spots on the surface 70 to be scanned, which occurs because the sagittal line shape of the lens surface 62b is the non-arc shape.

FIG. 16C shows the wave optics interval of the scanning line at the barycentric position of the spot intensity distribution, which is a sum of the geometric optics interval of the scanning line and an amount of the barycentric position shift of the spot intensity distribution (sum of amounts of the barycentric position shifts of the spots with respect to the position of each principal ray on the surface to be scanned).

When the two light emitting parts A and B are arranged as illustrated in FIG. 14, both the non-uniformity of the scanning line interval caused because the optical system is the oblique incident optical system in the sub-scanning direction and the non-uniformity of the scanning line interval caused because the sagittal line shape is the non-arc shape are smaller on the scanning start side than on the scanning end side. Therefore, the non-uniformity of the wave optics interval of the scanning line shown in FIG. 16C is increased. Accordingly, a variation of the magnification in the sub-scanning direction required to obtain the uniform wave optics interval of the scanning line is increased.

Figure 1C:
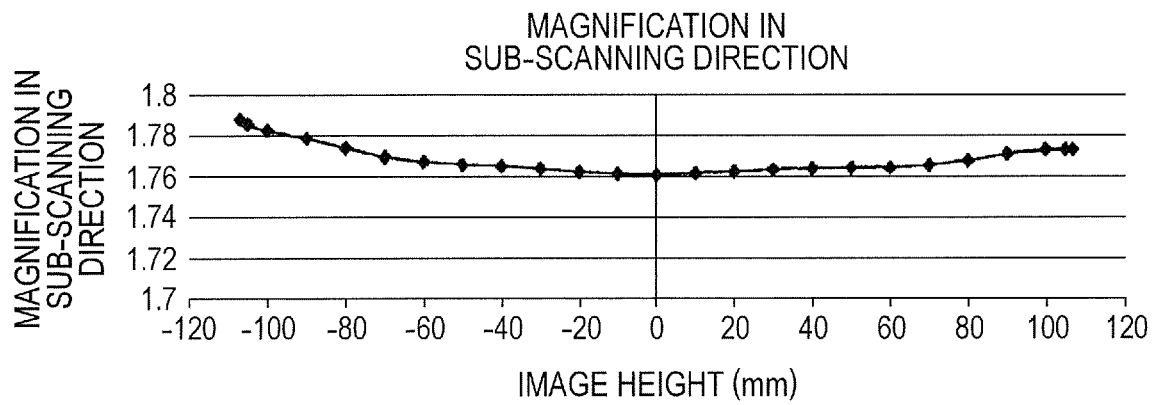
FIG. 1C is a graph of an optical characteristic diagram of the optical scanning apparatus according to one embodiment of the present invention, showing a magnification in a sub-scanning direction.

Arrangement of Light Source and Reduction of Magnification in Sub-Scanning Direction and Obtaining Uniform Scanning Line Interval according to First Embodiment Therefore, in the first embodiment, the two light emitting parts A and B are arranged as illustrated in FIG. 5. With this arrangement, the characteristic in which the interval in the sub-scanning direction between a plurality of scanning lines based on the position of the principal ray on the surface to be scanned varies in the main scanning direction becomes the characteristic shown in FIG. 1A. That is, the characteristic shown in FIG. 1A and the characteristic in which the interval in the sub-scanning direction between a plurality of scanning lines based on the barycentric position of each of the plurality of spot images on the surface to be scanned varies in the main scanning direction shown in FIG. 1B show variations in the opposite directions to each other. In this manner, by setting the characteristic shown in FIG. 1A and the characteristic shown in FIG. 1B in an opposite relationship, it is possible to reduce the variation of the magnification in the sub-scanning direction required to obtain the uniform wave optics interval of the scanning line. FIG. 1C shows the magnification in the sub-scanning direction with a variation rate in the main scanning direction suppressed to a small value, and FIG. 1D shows the uniformity of the wave optics interval of the scanning line at the barycentric position of the spot intensity distribution derived from the characteristics shown in FIGS. 1A, 1B and 1C.

Figure 1D:
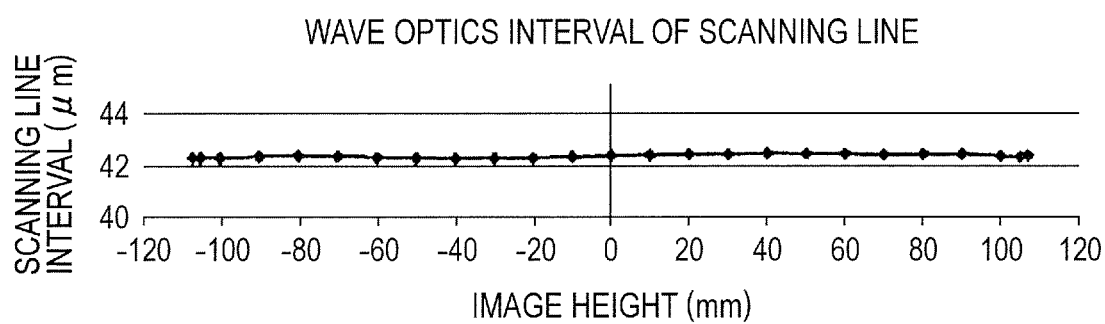
FIG. 1D is a graph of an optical characteristic diagram of the optical scanning apparatus according to one embodiment of the present invention, showing a wave optics interval of the scanning line.

In the first embodiment, the wave optics interval of the scanning line is configured to be uniform as shown in FIG. 1D by causing the variation of the magnification in the sub-scanning direction in the effective scanning area to have the extremum and to vary in an asymmetric manner in the main scanning direction as shown in FIG. 1C. In FIG. 1C, the horizontal axis represents the scanning image height (mm) on the surface 70 to be scanned, where the positive side is the scanning start side (the upper side in FIG. 2) and the negative side is the scanning end side (the lower side in FIG. 2). The wave optics interval of the scanning line in the effective scanning area is 42.26 µm to 42.46 µm with a peak-to-peak fluctuation of equal to or smaller than 0.2 µm. Thus, it is found that the wave optics interval of the scanning line is uniform.

Figure 1E:
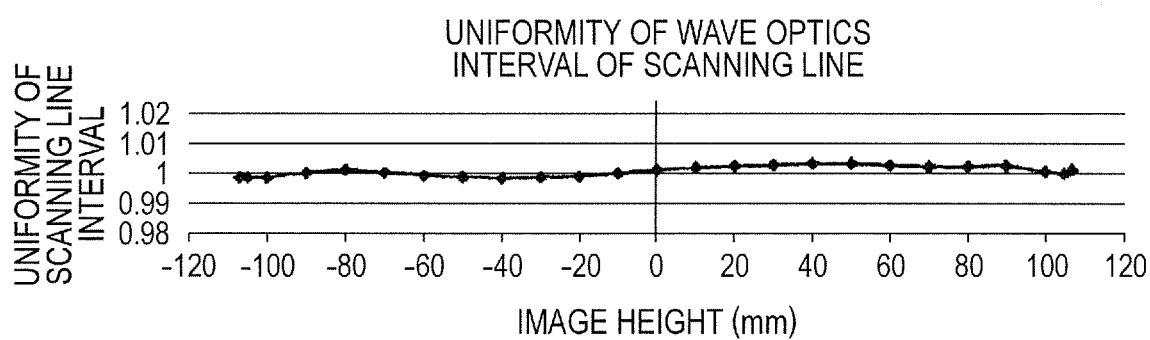
FIG. 1E is a graph of an optical characteristic diagram of the optical scanning apparatus according to one embodiment of the present invention, showing a uniformity of the wave optics interval of the scanning line.

FIG. 1E shows the uniformity of the wave optics interval of the scanning line in the sub-scanning direction according to the first embodiment. The resolution in the sub-scanning direction is 600 dpi and the desired scanning line interval under this condition, which is 42.33 µm, is normalized to 1.

Position of Aperture Stop

In the first embodiment, the first aperture stop 41 for limiting the light beam width in the sub-scanning direction and the second aperture stop 42 for limiting the light beam width in the main scanning direction are provided in a separate manner. With this configuration, the degree of freedom of arranging the first aperture stop is increased, and as a result, the variation of the magnification in the sub-scanning direction can be further reduced. The position in the sub-scanning direction where the two principal rays of the light beam respectively emitted from the two light emitting parts A and B pass through the lens surface 62b having the non-arc sagittal line shape is changed depending on the position of the first aperture stop 41.

Therefore, the amount of the barycentric position shift of the spot intensity distribution changes with respect to the arriving positions of the two principal rays on the surface 70 to be scanned. The magnitude of the non-uniformity of the scanning line interval due to the non-arc shape of the sagittal line can be changed by the position of the first aperture stop 41 without changing the aspheric coefficient value of the sagittal line itself.

On the other hand, if rotation angles of the two light emitting points A and B (δ in FIG. 5) are changed, the magnitude of the non-uniformity of the scanning line interval due to the fact that the optical system is the oblique incident optical system in the sub-scanning direction can be changed. However, the rotation angle δ necessary for obtaining a desired scanning line interval according to the resolution is determined by the magnification in the sub-scanning direction, and therefore, it is hard to change the rotation angle δ. For this reason, by increasing the degree of freedom of arranging the first aperture stop 41, the first aperture stop 41 is arranged at a position at which the variation of the magnification in the sub-scanning direction is decreased.

With the above-mentioned configuration, in the multi-beam optical scanning apparatus including the lens surface having the non-arc sagittal line shape in the imaging optical system 60, it is possible to obtain a uniform wave optics interval of the scanning line at the barycentric position of the spot intensity distribution in the effective scanning area. Owing to this, a multi-beam optical scanning apparatus suitable for high resolution image output can be provided. In addition, a fluctuation of the spot diameter in the sub-scanning direction can be reduced by reducing the variation of the magnification in the sub-scanning direction required to obtain the uniform wave optics interval of the scanning line.

Second Embodiment

Figure 17:
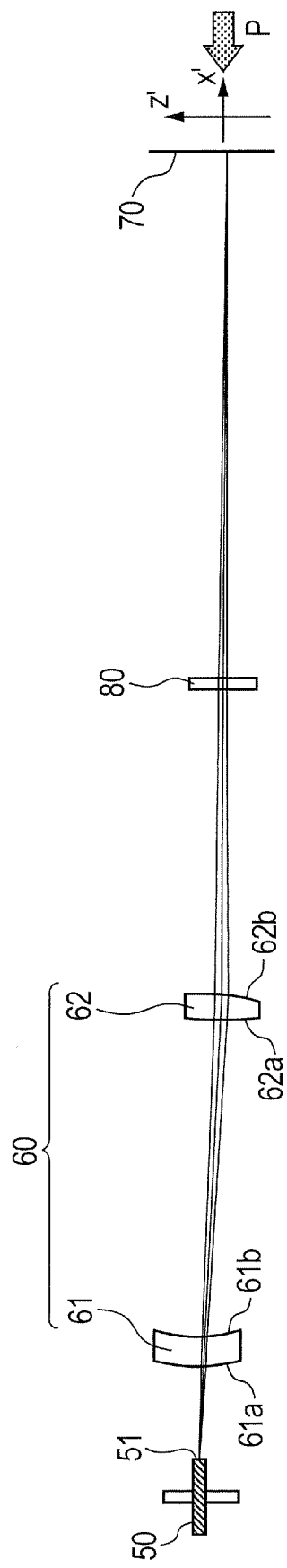
FIG. 17 is a cross-sectional view of main parts of an optical scanning apparatus according to a second embodiment of the present invention in the sub-scanning direction from a deflecting surface to a surface to be scanned.
Figure 18:
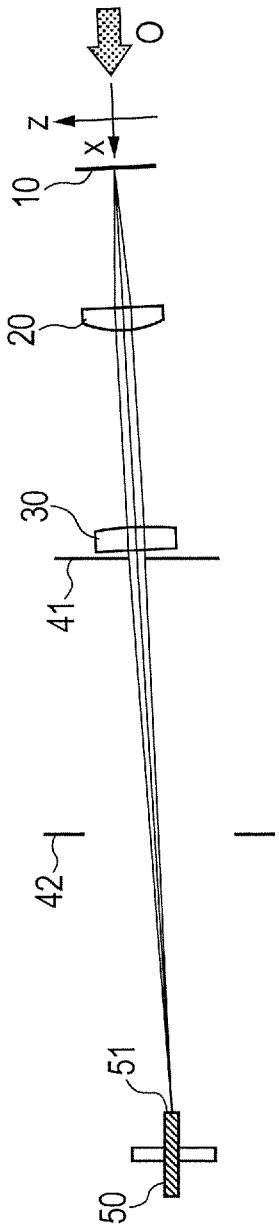
FIG. 18 is a cross-sectional view of the main parts of the optical scanning apparatus according to the second embodiment in the sub-scanning direction from a light emitting part to the deflecting surface.

FIGS. 17 and 18 are cross-sectional views of the main parts in the sub-scanning direction of the multi-beam optical scanning apparatus according to a second embodiment of the present invention (cross-sectional views in the sub-scanning direction). FIG. 17 is a cross-sectional view of an imaging optical system 60 as a second optical system in a range from a deflecting surface 51 of a rotary polygon mirror 50 that is a deflector to a surface 70 to be scanned in the sub-scanning direction. FIG. 18 is a cross-sectional view of an incident optical system LA as a first optical system in a range from two light emitting parts (light emitting points) A and B of a light source 10 to the deflecting surface 51 in the sub-scanning direction.

Figure 19:
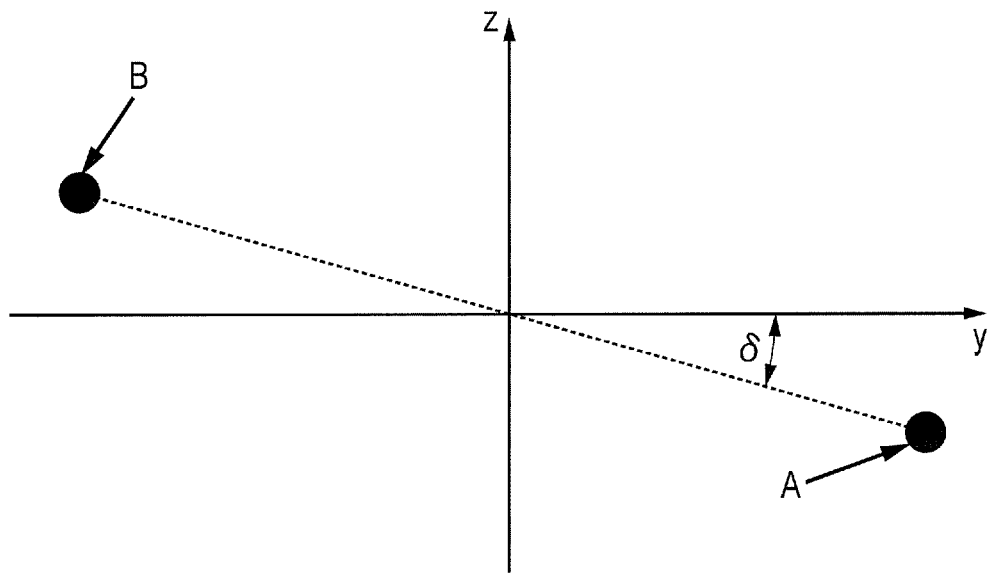
FIG. 19 is a diagram illustrating an arrangement of two light emitting parts according to the second embodiment.

In FIGS. 17 and 18, the same elements as those of FIGS. 3 and 4 are assigned with the same reference numerals. As is found from FIG. 18, the incident direction in the sub-scanning direction of the second embodiment is different from that of the first embodiment, where the light beams enter the arrangement reference plane at an angle of 3 degrees from the upper side. In this embodiment, the cross-sectional views in the main scanning direction have the same arrangements as those of the cross-sectional views illustrated in FIGS. 3 and 4 of the first embodiment. As illustrated in FIG. 19, the two light emitting parts A and B are arranged in an inclined manner in a direction opposite to that of the first embodiment. The magnitude of the rotation angle δ is the same as that of the first embodiment.

Figure 20:
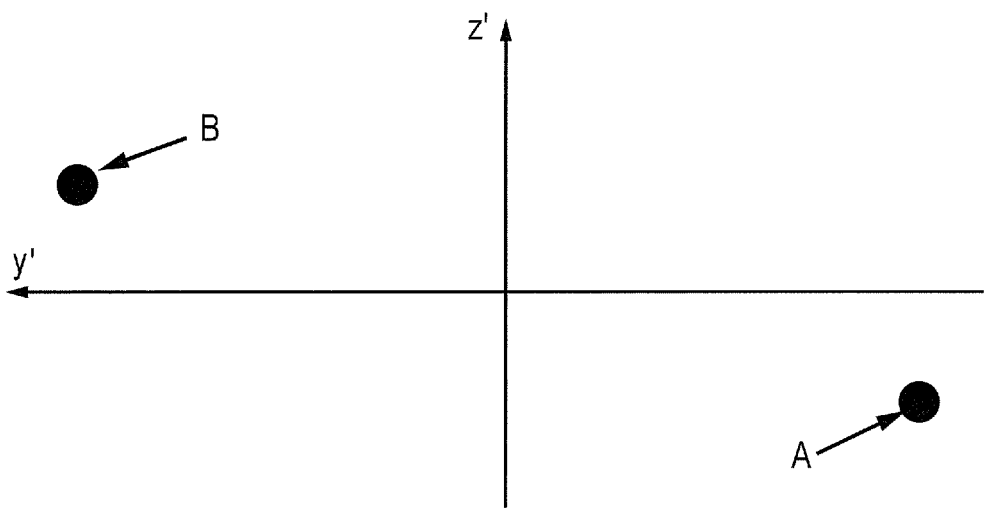
FIG. 20 is a diagram illustrating spot imaging positions of the two light beams on the surface to be scanned according to the second embodiment.

Further, in the second embodiment, a positional relationship of the spot imaging positions on the surface 70 to be scanned is as illustrated in FIG. 20, where the sub-scanning direction is reversed with respect to the first embodiment. The characteristics of the optical system according to the second embodiment are shown in Table 2. In Table 2, "E-x" indicates "$10^{-x}$". Further, all coefficients not particularly mentioned are zero.

TABLE 2

| Configuration of incident optical system/ Arrangement of imaging optical system | | | | | Data on lens surface of imaging optical system | | | |
|---|---|---|---|---|---|---|---|---|
| | | | | | First fθ lens | | Second fθ lens | |
| | | | | | 61a surface | 61b surface | 62a surface | 62b surface |
| Wavelength of light source | λ (nm) | 790 | | | | | | |
| Number of light emitting points | n | 2 | | | | | | |
| Thickness of laser cover glass | dog (mm) | 0.25000 | Meridional line | R | −3.47152E+01 | −2.58903E+01 | −5.00000E+02 | 4.40776E+03 |
| Refractive index of laser cover glass | n0 | 1.51052 | | K | 2.38257E-01 | −7.67505E-01 | 0.00000E+00 | 1.72444E+01 |
| Light emitting point - First surface of collimator lens | d0 (mm) | 10.30500 | | B2 | 0.00000E+00 | 0.00000E+00 | 0.00000E+00 | 0.00000E+00 |
| Curvature radius of first surface of collimator lens | R1 (mm) | ∞ | | B4 | 1.85108E-07 | −2.77170E-06 | 0.00000E+00 | −7.94656E-07 |
| Curvature radius of second surface of collimator lens | R2 (mm) | −15.21639 | | B6 | 4.83447E-08 | 1.81844E-08 | 0.00000E+00 | 1.75850E-10 |
| Thickness of collimator lens | d1 (mm) | 3.00000 | | B8 | −1.81673E-10 | −3.05385E-11 | 0.00000E+00 | −3.62924E-14 |
| Refractive index of collimator lens | n1 | 1.76167 | | B10 | 1.99164E-13 | −3.19200E-14 | 0.00000E+00 | 3.95244E-18 |
| Second surface of collimator lens - First surface of cylindrical lens | d2 (mm) | 25.57500 | | B12 | 0.00000E+00 | 0.00000E+00 | 0.00000E+00 | 0.00000E+00 |
| Curvature radius in sub-scanning direction of first surface of cylindrical lens | Rs3 (mm) | 41.03107 | Sagittal line | r | 2.50000E+01 | 2.50000E+01 | 6.77042E+01 | −3.96920E+01 |
| Curvature radius in main scanning direction of first surface of cylindrical lens | Rm3 (mm) | ∞ | | k | 0.00000E+00 | 0.00000E+00 | 0.00000E+00 | 0.00000E+00 |
| Curvature radius in sub-scanning direction of second surface of cylindrical lens | Rs4 (mm) | ∞ | | D2u | 0.00000E+00 | −4.15046E-04 | 0.00000E+00 | 1.93647E-04 |
| Curvature radius in main scanning direction of second surface of cylindrical lens | Rm4 (mm) | ∞ | | D4u | 0.00000E+00 | 1.15992E-06 | 0.00000E+00 | −2.88008E-08 |
| Thickness of cylindrical lens | d3 (mm) | 3.00000 | | D6u | 0.00000E+00 | −2.21105E-09 | 0.00000E+00 | −2.42773E-12 |
| Refractive index of cylindrical lens | n2 | 1.52397 | | D8u | 0.00000E+00 | 5.93772E-12 | 0.00000E+00 | 7.51862E-15 |
| Second surface of cylindrical lens - First aperture stop | d4 (mm) | 0.90400 | Sagittal line | D10u | 0.00000E+00 | −1.06463E-15 | 0.00000E+00 | −1.88312E-18 |
| First aperture stop - Second aperture stop | d5 (mm) | 35.94600 | | D2l | 0.00000E+00 | −6.10821E-05 | 0.00000E+00 | 2.00919E-04 |
| Second aperture stop - Deflecting surface on axis | d6 (mm) | 40.00000 | | D4l | 0.00000E+00 | 1.79288E-06 | 0.00000E+00 | −8.97607E-09 |
| Deflecting surface on axis - Lens surface 61a | d7 (mm) | 20.00000 | | D6l | 0.00000E+00 | −1.16500E-08 | 0.00000E+00 | −3.56175E-11 |
| Thickness of first fθ lens (61a-61b) | d8 (mm) | 5.00000 | | D8l | 0.00000E+00 | 2.65394E-11 | 0.00000E+00 | 3.08916E-14 |
| Refractive index of first fθ lens | n3 | 1.52397 | | D10l | 0.00000E+00 | −1.75853E-15 | 0.00000E+00 | −7.67333E-18 |
| Lens surface 61b - Lens surface 62a | d9 (mm) | 51.50000 | | G0.1 | | | −5.94719E-03 | 9.10000E-02 |
| Thickness of second fθ lens (62a-62b) | d10 (mm) | 4.00000 | | G1.1 | | | −5.33126E-05 | −4.19533E-05 |
| Refractive index of second fθ lens | n4 | 1.52397 | | G2.1 | | | −3.66915E-05 | −4.63618E-05 |
| Lens surface 62b - First surface of dustproof glass | d11 (mm) | 49.62080 | | G3.1 | | | −3.17055E-07 | −2.63210E-07 |
| Thickness of dustproof glass | d12 (mm) | 1.80000 | | G4.1 | | | 4.24586E-08 | 4.31205E-08 |

TABLE 2-continued

| Configuration of incident optical system/ Arrangement of imaging optical system | | | Data on lens surface of imaging optical system | | | | |
|---|---|---|---|---|---|---|---|
| | | | First fθ lens | | Second fθ lens | | |
| | | | 61a surface | 61b surface | 62a surface | 62b surface | |
| Refractive index of dustproof glass | n5 | 1.51052 | G5.1 | | | −6.80412E−11 | −6.03398E−11 |
| Second surface of dustproof glass - Surface to be scanned | d13 (mm) | 85.28920 | G6.1 | | | −2.46411E−11 | −2.50770E−11 |
| Incident angle in main scanning direction of rotary polygon mirror of incident optical system | α | 89.50000 | G7.1 | | | 2.30299E−13 | 1.56085E−13 |
| Incident angle in sub-scanning direction of rotary polygon mirror of incident optical system | β | 3.00000 | G8.1 | | | 4.17407E−15 | 6.56057E−15 |
| Effective scanning angle | γ | ±32.437292 | G9.1 | | | −1.13831E−16 | −6.12653E−17 |
| Number of mirror surfaces of rotary polygon mirror | men | 4 | G10.1 | | | 1.84777E−18 | −3.53900E−20 |
| Radius of circumscribing circle of rotary polygon mirror | RpoI | 10.00000 | Sagittal line | G11.1 | | 1.44376E−20 | 1.16976E−21 |
| Aperture stop diameter (second aperture stop × first aperture stop) | rectangular (mm) | 3.63 × 2.16 | G12.1 | | | −5.54400E−22 | −1.42449E−22 |
| | | | G13.1 | | | 1.28014E−24 | 2.16454E−24 |
| | | | G0.4 | | | | −3.25056E−05 |
| | | | G1.4 | | | | 3.90324E−07 |
| | | | G2.4 | | | | 1.80524E−08 |
| | | | G3.4 | | | | 2.94091E−10 |
| | | | G4.4 | | | | 8.75123E−12 |
| | | | G5.4 | | | | −1.55063E−13 |
| | | | G6.4 | | | | −3.92266E−15 |

* Refractive index is a value at the wavelength of 790 nm

Figure 21:
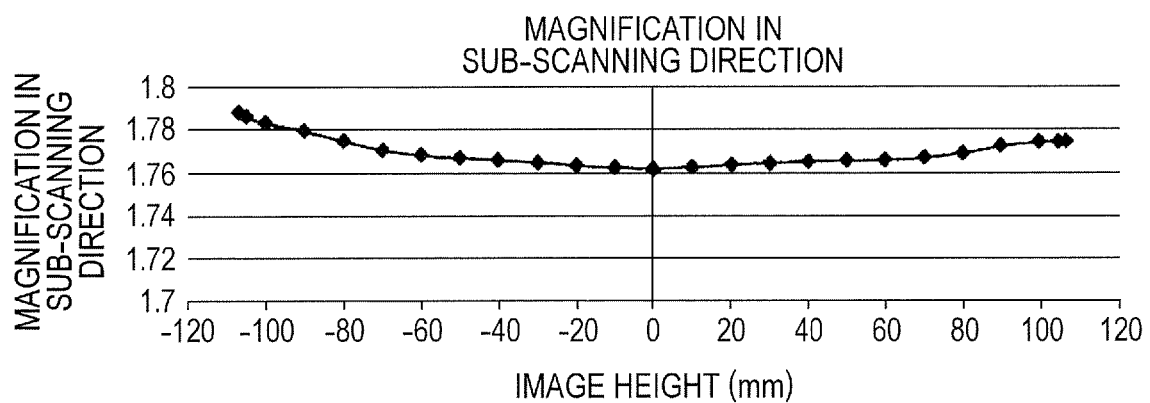
FIG. 21 is a graph showing a magnification in the sub-scanning direction between the deflecting surface and the surface to be scanned according to the second embodiment.
Figure 22:
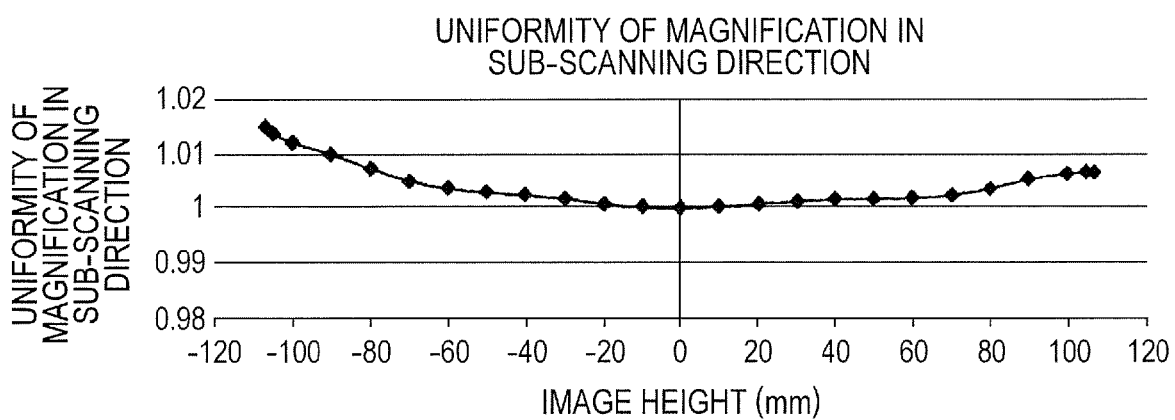
FIG. 22 is a graph showing a uniformity of the magnification in the sub-scanning direction according to the second embodiment.

In the second embodiment, the sign of a tilt variation coefficient (the first-order coefficient of Z) of each of lens surfaces 62a to 62b of a second fθ lens 62 differs from that of the first embodiment. Other configurations are the same as those of the first embodiment. FIG. 21 is a graph showing the magnification in the sub-scanning direction of the imaging optical system 60 between the deflecting surface 51 and the surface 70 to be scanned according to the second embodiment. FIG. 22 is a graph showing a uniformity of the magnification in the sub-scanning direction with a magnification βc in the sub-scanning direction at a scanning center portion in FIG. 21 normalized to one. As is found from FIG. 22, the variation of the magnification in the sub-scanning direction has an extremum and varies in an asymmetric manner in the main scanning direction in the effective scanning area.

Figure 23:
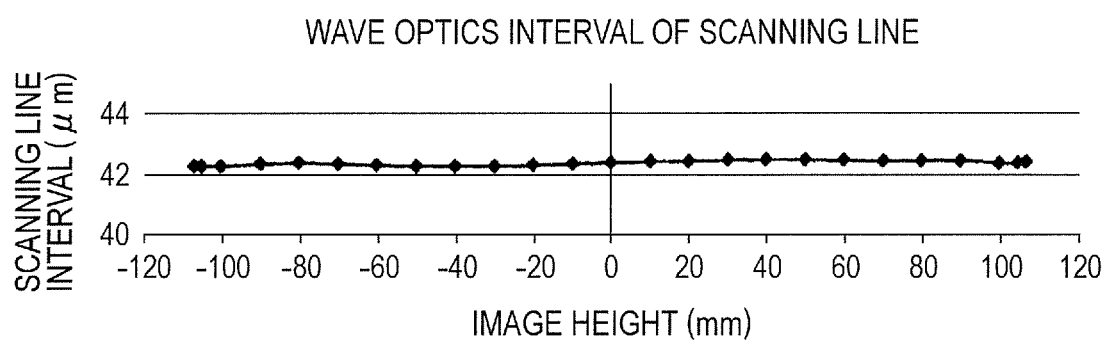
FIG. 23 is a graph showing a wave optics interval of the scanning line according to the second embodiment.

FIG. 23 is a graph showing the wave optics interval of the scanning line in the sub-scanning direction according to this embodiment. The timing is shifted by a predetermined time δT so that an imaging position of a light beam Rb emitted from the light emitting part B is aligned at a position on a photosensitive drum surface where a light beam Ra emitted from the light emitting part A is focused. FIG. 23 shows the wave optics interval of the scanning line in the sub-scanning direction when the light beam Ra emitted from the light emitting part A and the light beam Rb emitted from the light emitting part B scan the surface 70 to be scanned at this time.

Figure 24:
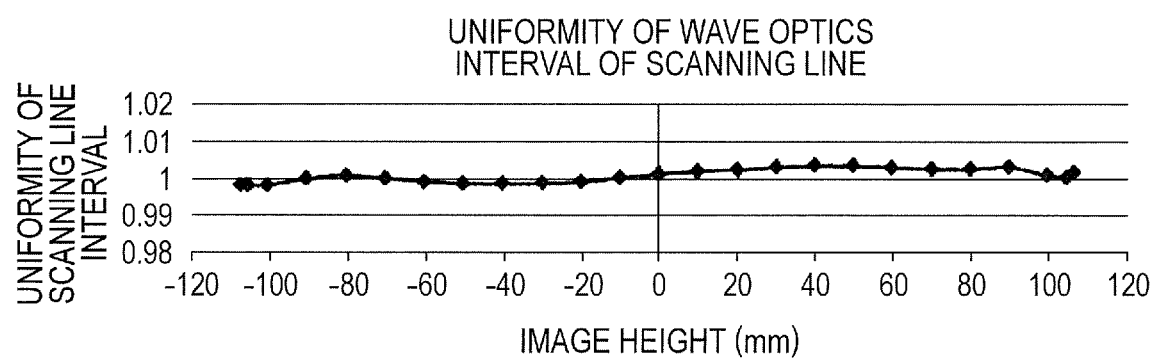
FIG. 24 is a graph showing a uniformity of the wave optics interval of the scanning line according to the second embodiment.

FIG. 24 is a graph showing the uniformity of the wave optics interval of the scanning line in the sub-scanning direction according to the second embodiment. The resolution in the sub-scanning direction is 600 dpi and the desired scanning line interval under this condition, that is, 42.33 μm, is normalized to one. FIGS. 21, 22, 23 and 24 correspond to FIGS. 13, 14, 1D and 1E of the first embodiment. This is because this embodiment has a configuration in which the sub-scanning direction of the first embodiment is reversed in the up-and-down direction.

In this embodiment, a direction heading for a position where the light source 10 is located with respect to the arrangement reference plane (the plane perpendicular to the rotation axis of the deflecting surface 51 of the rotary polygon mirror 50 and including the center of the deflecting surface of the deflector in the sub-scanning direction) is defined as a positive direction in the sub-scanning direction. Accordingly, a direction heading for the opposite side is defined as a negative direction in the sub-scanning direction. Between the light beams from the light emitting parts A and B deflected when the angle of the deflecting surface 51 is the same, the position of the spot focused on the surface to be scanned in the main scanning direction is as follows.

That is, the light emitting part B configured to emit the light beam closer to a side where the light source is arranged is arranged to be located in the positive direction in the sub-scanning direction with respect to the light emitting part A configured to emit the light beam of which a position of the spot focused on the surface to be scanned is closer to a side where the light source is not arranged. This is a relationship in which, in the same manner as the first embodiment, of the plurality of light emitting parts, the light emitting part A on a side where the spot image appears earlier in the main scanning direction is arranged to be a side closer to the arrangement reference plane in the sub-scanning direction with respect to the light emitting part B. With this arrangement, the variation of the magnification in the sub-scanning direction required to obtain the uniform wave optics interval of the scanning line is reduced.

With the above-mentioned configuration, in the multi-beam optical scanning apparatus including the lens surface having the non-arc sagittal line shape in the imaging optical system 60, it is possible to obtain, in the effective scanning area, the uniform wave optics interval of the scanning line at the barycentric position of the spot intensity distribution. Owing to this, a multi-beam optical scanning apparatus suitable for a high resolution image output can be provided. In addition, a fluctuation of the spot diameter in the sub-scanning direction can be reduced by reducing the variation of the magnitude in the sub-scanning direction required to obtain the uniform wave optics interval of the scanning line.

The exemplary embodiments of the present invention have been described so far. However, it is understood that the present invention is not limited to the exemplary embodiments, but as described below, various modifications and changes can be made within the scope of the gist.

First Modified Example

The above-mentioned embodiments employ a configuration in which the magnitude relationship is reversed between the scanning start side and the scanning end side from the characteristic of the variation of the barycentric position shift of the spot intensity distribution shown in FIG. 1B and the characteristic of the variation of the geometric optics interval of the scanning line shown in FIG. 1A. However, even in a case where the magnitude relationship is not reversed between the scanning start side and the scanning end side from the characteristic of the variation of the barycentric position shift of the spot intensity distribution and the characteristic of the variation of the geometric optics interval of the scanning line, if a tolerance allows, it is possible to obtain the uniform wave optics interval of the scanning line only with an adjustment of the magnification in the sub-scanning direction.

Specifically, the barycentric position of the spot images on the surface to be scanned regarding the scanning line is taken as the reference, and the wave optics interval of the scanning line in the sub-scanning direction based on the barycentric position of the spot images is kept uniform across the main scanning direction. To do this, the fθ lens system as the second optical system is configured to have the characteristic that causes the imaging magnification in the sub-scanning direction to vary in an asymmetric manner in the main scanning direction.

Second Modified Example

In addition, it is possible to obtain the uniform wave optics interval of the scanning line only by employing the configuration in which the magnitude relationship is reversed between the scanning start side and the scanning end side from the characteristic of the variation of the barycentric position shift of the spot intensity distribution shown in FIG. 1B and the characteristic of the variation of the geometric optics interval of the scanning line shown in FIG. 1A without employing the adjustment of the magnification in the sub-scanning direction. Hereinafter, a case where the magnification in the sub-scanning direction of the imaging optical system 60 is not changed in the main scanning direction but is kept constant in the effective scanning area is described. The characteristics of the optical system of the multi-beam optical scanning apparatus according to a second modified example are shown in Table 3.

TABLE 3

| Configuration of incident optical system/ Arrangement of imaging optical system | | | Data on lens surface of imaging optical system | | | | |
|---|---|---|---|---|---|---|---|
| | | | | First fθ lens | | Second fθ lens | |
| | | | | 61a surface | 61b surface | 62a surface | 62b surface |
| Wavelength of light source | λ (nm) | 790 | | | | | |
| Number of light emitting points | n | 2 | | | | | |
| Thickness of laser cover glass | dog (mm) | 0.25000 | Meridional line R | −3.47152E+01 | −2.58903E+01 | −5.00000E+02 | 4.40776E+03 |
| Refractive index of laser cover glass | n0 | 1.51052 | K | 2.38257E−01 | −7.67505E−01 | 0.00000E+00 | 1.72444E+01 |
| Light emitting point - First surface of collimator lens | d0 (mm) | 10.30500 | B2 | 0.00000E+00 | 0.00000E+00 | 0.00000E+00 | 0.00000E+00 |
| Curvature radius of first surface of collimator lens | R1 (mm) | ∞ | B4 | 1.85108E−07 | −2.77170E−06 | 0.00000E+00 | −7.94656E−07 |
| Curvature radius of second surface of collimator lens | R2 (mm) | −15.21639 | B6 | 4.83447E−08 | 1.81844E−08 | 0.00000E+00 | 1.75850E−10 |
| Thickness of collimator lens | d1 (mm) | 3.00000 | B8 | −1.81673E−10 | −3.05385E−11 | 0.00000E+00 | −3.62924E−14 |
| Refractive index of collimator lens | n1 | 1.76167 | B10 | 1.99164E−13 | −3.19200E−14 | 0.00000E+00 | 3.95244E−18 |
| Second surface of collimator lens - First surface of cylindrical lens | d2 (mm) | 25.57500 | B12 | 0.00000E+00 | 0.00000E+00 | 0.00000E+00 | 0.00000E+00 |
| Curvature radius in sub-scanning direction of first surface of cylindrical lens | Rs3 (mm) | 41.03107 | Sagittal line r | 2.50000E+01 | 2.50000E+01 | 6.51976E+01 | −4.06077E+01 |
| Curvature radius in main scanning direction of first surface of cylindrical lens | Rm3 (mm) | ∞ | k | 0.00000E+00 | 0.00000E+00 | 0.00000E+00 | 0.00000E+00 |
| Curvature radius in sub-scanning direction of second surface of cylindrical lens | Rs4 (mm) | ∞ | D2u | 0.00000E+00 | −4.15046E−04 | 2.44785E−04 | 5.92541E−05 |
| Curvature radius in main scanning direction of | Rm4 (mm) | ∞ | D4u | 0.00000E+00 | 1.15992E−06 | 1.19450E−08 | −3.63665E−08 |

TABLE 3-continued

| Configuration of incident optical system/ Arrangement of imaging optical system | | | Data on lens surface of imaging optical system | | | | |
|---|---|---|---|---|---|---|---|
| | | | | First fθ lens | | Second fθ lens | |
| | | | | 61a surface | 61b surface | 62a surface | 62b surface |
| second surface of cylindrical lens | | | | | | | |
| Thickness of cylindrical lens | d3 (mm) | 3.00000 | D6u | 0.00000E+00 | −2.21105E−09 | 3.32797E−12 | 7.81735E−12 |
| Refractive index of cylindrical lens | n2 | 1.52397 | D8u | 0.00000E+00 | 5.93772E−12 | −1.69149E−14 | 5.84201E−15 |
| Second surface of cylindrical lens - First aperture stop | d4 (mm) | 0.90400 | D10u | 0.00000E+00 | −1.06463E−15 | 354929E−18 | −1.80098E−18 |
| First aperture stop - Second aperture stop | d5 (mm) | 35.94600 | D2I | 0.00000E+00 | −6.10821E−05 | 4.08754E−04 | 2.17972E−05 |
| Second aperture stop - Deflecting surface on axis | d6 (mm) | 40.00000 | D4I | 0.00000E+00 | 1.79288E−06 | −7.28817E−08 | 5.55039E−08 |
| Deflecting surface on axis - Lens surface 61a | d7 (mm) | 20.00000 | D6I | 0.00000E+00 | −1.16500E−08 | 1.07866E−10 | −7.24746E−11 |
| Thickness of first fθ lens (61a-61b) | d8 (mm) | 5.00000 | D8I | 0.00000E+00 | 2.65394E−11 | −9.37736E−15 | 1.34867E−14 |
| Refractive index of first fθ lens | n3 | 1.52397 | D10I | 0.00000E+00 | −1.75853E−15 | 3.83442E−17 | 1.55982E−18 |
| Lens surface 61b - Lens surface 62a | d9 (mm) | 51.50000 | G0.1 | | | 9.04259E−03 | −8.85040E−02 |
| Thickness of second fθ lens (62a-62b) | d10 (mm) | 4.00000 | G1.1 | | | 2.02233E−05 | 9.47170E−05 |
| Refractive index of second fθ lens | n4 | 1.52397 | G2.1 | | | 3.68245E−05 | 4.71441E−05 |
| Lens surface 62b - First surface of dustproof glass | d11 (mm) | 49.62080 | G3.1 | | | 3.39134E−07 | 2.76069E−07 |
| Thickness of dustproof glass | d12 (mm) | 1.80000 | G4.1 | | | −4.19153E−08 | −4.28997E−08 |
| Refractive index of dustproof glass | n5 | 1.51052 | G5.1 | | | 5.31501E−11 | 6.10064E−11 |
| Second surface of dustproof glass - Surface to be scanned | d13 (mm) | 85.28920 | G6.1 | | | 2.47262E−11 | 2.52896E−11 |
| Incident angle in main scanning direction of rotary polygon mirror of incident optical system | α | 89.50000 | G7.1 | | | −2.19551E−13 | −1.65009E−13 |
| Incident angle in sub-scanning direction of rotary polygon mirror of incident optical system | β | 3.00000 | G8.1 | | | −4.02239E−15 | 6.47034E−15 |
| Effective scanning angle | γ | ±32.437292 | G9.1 | | | 1.09199E−16 | 6.68192E−17 |
| Number of mirror surfaces of rotary polygon mirror | men | 4 | G10.1 | | | −1.77747E−18 | 8.47639E−20 |
| Radius of circumscribing circle of rotary polygon mirror | RpoI | 10.00000 | G11.1 | | | −1.37902E−20 | −2.42720E−21 |
| Aperture stop diameter (second aperture stop × first aperture stop) | rectangular (mm) | 3.63 × 2.16 | G12.1 | | | 5.01796E−22 | 1.09234E−22 |
| | | | G13.1 | | | −1.80617E−24 | −2.49669E−24 |
| | | | G0.4 | | | | −3.25056E−05 |
| | | | G1.4 | | | | 3.90324E−07 |
| | | | G2.4 | | | | 1.80524E−08 |
| | | | G3.4 | | | | 2.94091E−10 |
| | | | G4.4 | | | | 8.75123E−12 |
| | | | G5.4 | | | | −1.55063E−13 |
| | | | G6.4 | | | | −3.92266E−15 |

\* Refractive index is a value at the wavelength of 790 nm

The equations defining the meridional line shape and the sagittal line shape of the lens surfaces of the first fθ lens 61 and the second fθ lens 62 constituting the imaging optical system 60 are the same as those of the above-mentioned first embodiment. Further, all the coefficients other than the curvature radius variation coefficients D2 to D10 of the sagittal line are the same as those of the first embodiment. Cross-sectional views in the main scanning direction and the sub-scanning direction according to the second modified example have the same arrangement as those of the cross-sectional views illustrated in FIGS. 2 to 4 of the first embodiment, and arrangements of the two light emitting parts A and B are the same as those illustrated in FIG. 5.

Figure 9:
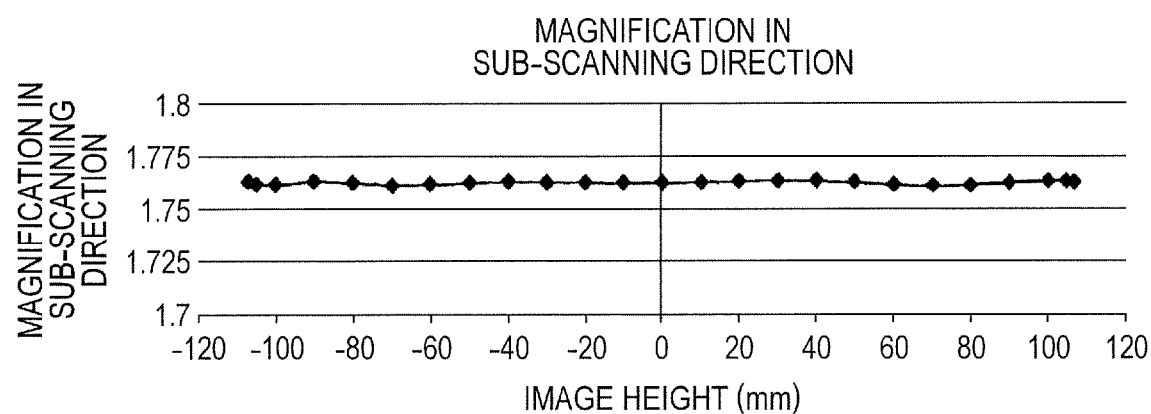
FIG. 9 is a graph showing a magnification in the sub-scanning direction between a deflecting surface and a surface to be scanned according to a modified example.
Figure 10:
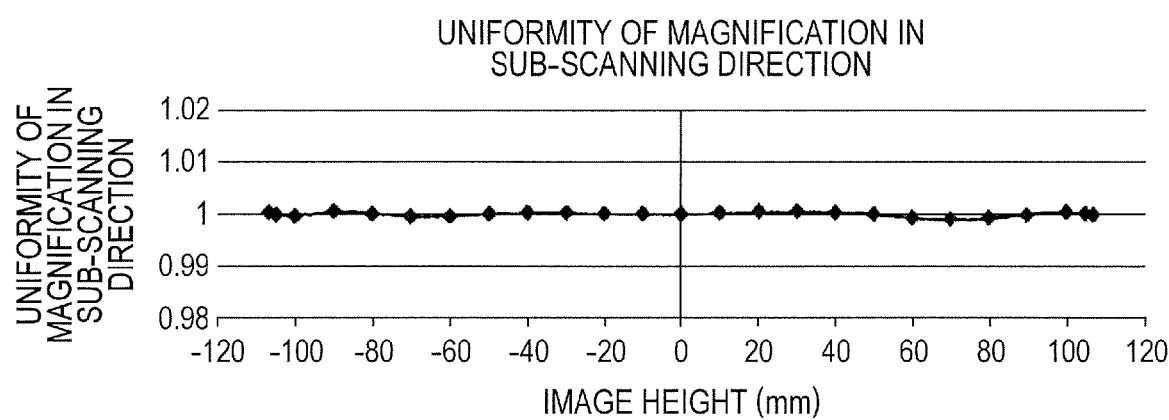
FIG. 10 is a graph showing a uniformity of the magnification in the sub-scanning direction according to the modified example.
Figure 11A:
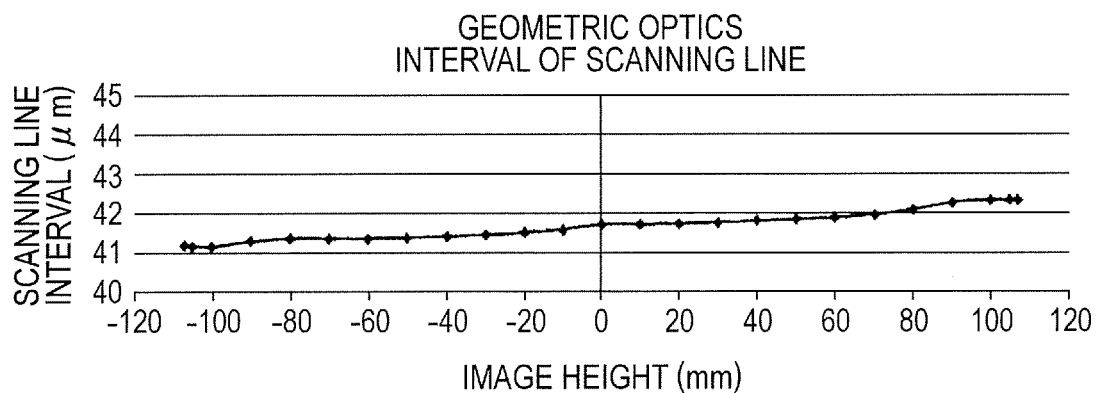
FIG. 11A is a graph of an optical characteristic according to the modified example, showing a geometric optics interval of the scanning line.
Figure 11B:
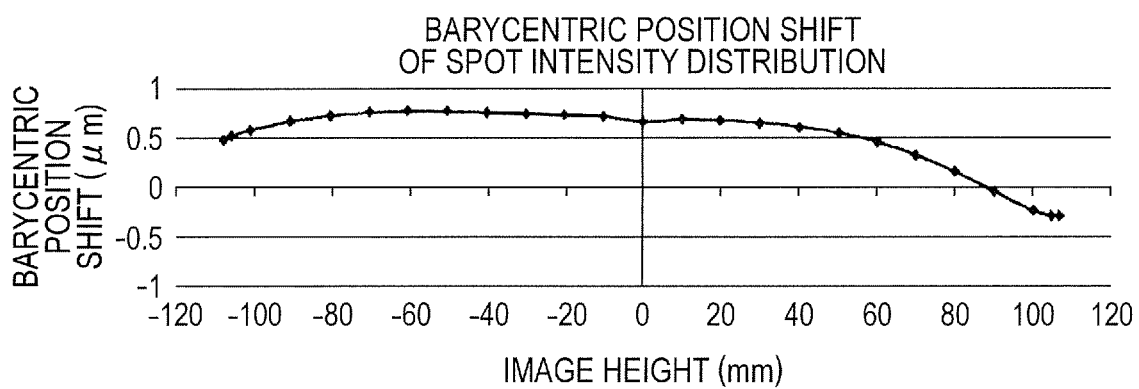
FIG. 11B is a graph of an optical characteristic according to the modified example, showing a barycentric position shift of a spot intensity distribution.
Figure 11C:
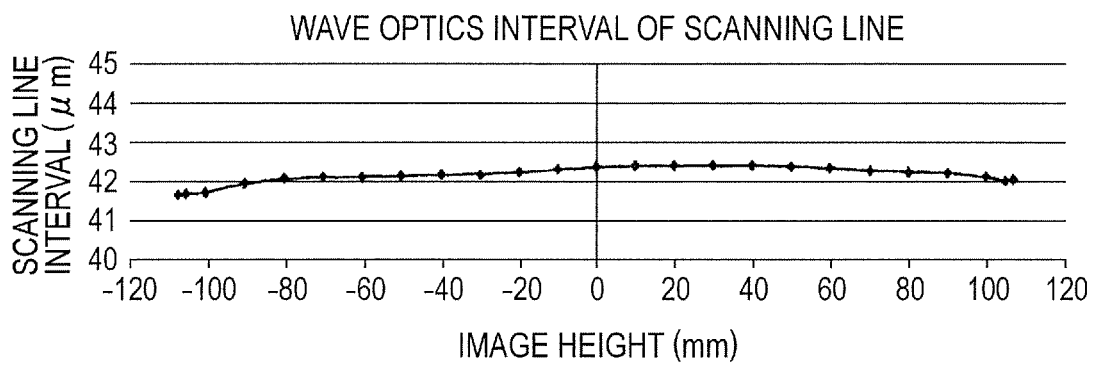
FIG. 11C is a graph of an optical characteristic according to the modified example, showing a wave optics interval of the scanning line.

FIG. 9 is a graph showing the magnification in the sub-scanning direction of the imaging optical system 60 between the deflecting surface 51 and the surface 70 to be scanned. In FIG. 9, the horizontal axis represents the scanning image height (mm) on the surface 70 to be scanned, where the positive side is the scanning start side (the upper side in FIG. 2) and the negative side is the scanning end side (the lower side in FIG. 2). FIG. 10 is a graph showing a uniformity of the magnification in the sub-scanning direction with a magnification βc in the sub-scanning direction at a scanning center portion in FIG. 9 normalized to one. FIG. 11C is a graph showing a sum of the geometric optics interval of the scanning line shown in FIG. 11A and an amount of the barycentric position of the spot intensity distribution shown in FIG. 11B (a sum of amounts of the barycentric position shifts with respect to the position of each principal ray on the surface to be scanned), which is the wave optics interval of the scanning line based on the barycentric position of the spot intensity distribution.

As this modified example, it is possible to obtain the substantially uniform interval of the scanning line with the magnification in the sub-scanning direction kept constant, i.e., without considering the magnification in the sub-scanning direction.

Third Modified Example

In the above-mentioned embodiments, the non-arc shape including the fourth-order aspheric term is introduced as the non-arc shape of the sagittal line. However, a term higher than the fourth-order can be added. In this case, for example, the lens surface 62b can be a non-arc shape including the aspheric term higher than the fourth-order, so that a variation of the aspheric term of any order higher than the fourth-order in the main scanning direction has an extremum in the effective area of the optical plane. Further, although the fθ lens system is formed of two imaging optical elements, the present invention is not limited to this, but the fθ lens system can be formed of one or more imaging optical elements. In the above-mentioned embodiments, a non-arc shape including the fourth-order aspheric term when the sagittal line shape is defined by Equation (2) has been described. In other words, this non-arc shape can be, for example, "a shape obtained by a function having the fourth-order term (fourth-order component) when a shift amount of a sagittal line shape from a circular shape obtained by fitting the sagittal line shape in the sub-scanning section by the least squared approximation is represented by the function with a position in the sub-scanning direction (Z direction)". That is, even in a case where the non-arc shape of the sagittal line of the fθ lens is defined by an equation other than the above-mentioned Equation (2), it can be considered in the same manner as the non-arc shape according to the this modified example, so long as the equation represents a non-arc shape having the fourth-order term or higher when the equation is converted into an equation corresponding to Equation (2).

Fourth Modified Example

Further, the light source is not limited to the monolithic multi-semiconductor laser including two light emitting parts, but can be a light source including three or more light emitting parts or a light source including even more light emitting parts, such as a surface emitting laser. In this case as well, the same effect can be obtained by satisfying the above-mentioned configuration with a light emitting part configured to emit a light beam for scanning first (earlier) and a light emitting part configured to emit a light beam for scanning last (later).

Fifth Modified Example

In the above-mentioned embodiments, a system in which the shift of the position of the scanning line in the sub-scanning direction based on the barycentric position of the spot image on the surface to be scanned is larger on the scanning end side than on the scanning start side has been described. However, a system in which the shift of the position is smaller on the scanning end side than on the scanning start side can also be used. In this case, the plurality of light emitting parts of the light source can be arranged so that the interval of the scanning line in the sub-scanning direction based on the position of the principal ray on the surface to be scanned is smaller on the scanning end side than on the scanning start side.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-002079, filed Jan. 10, 2012, which is hereby incorporated by reference herein in its entirety.

What is claimed is:

1. An optical scanning apparatus, comprising:
a light source including a plurality of light emitting parts;
a deflector including a deflecting surface and configured to deflect a plurality of light beams respectively emitted from the plurality of light emitting parts for scanning by the deflecting surface in a main scanning direction;
a first optical system configured to cause the plurality of light beams to enter the deflecting surface of the deflector at an oblique angle within a sub-scanning section perpendicular to the main scanning direction; and
a second optical system configured to focus the plurality of light beams deflected by the deflecting surface of the deflector on a surface to be scanned to form a plurality of spot images defining a plurality of scanning lines on the surface to be scanned, wherein:
the plurality of light emitting parts are arranged away from each other in a sub-scanning direction perpendicular to the main scanning direction and to a direction of an optical axis of the second optical system;
the second optical system includes an optical element including at least one optical surface having a non-arc shape within the sub-scanning section, which asymmetrically varies in the main scanning direction, so that a wave optics interval in the sub-scanning direction between the plurality of scanning lines based on barycentric positions of the plurality of spot images on the surface to be scanned is aligned along the main scanning direction;
when the non-arc shape of the at least one optical surface of the optical element within the sub-scanning section is defined by $$S = \frac{\frac{Z^2}{r'}}{1 + \sqrt{1 - (1+k)\left(\frac{Z}{r'}\right)^2}} + \sum_{k=1}^{16}\sum_{j=0}^{16} G_{jk} Y^j Z^k,$$

$$r' = r\left(1 + \sum_{i=2}^{10} D_i Y^i\right)$$

where S is the non-arc shape of the at least one optical surface of the optical element within the sub-scanning section, Y axis is an axis perpendicular to the optical axis in the main scanning direction, Z axis is an axis perpendicular to the optical axis in the sub-scanning direction, r is a curvature radius of the at least one optical surface on the optical axis within the sub-scanning section, r' is a curvature radius of the at least one optical surface within the sub-scanning section, $D_i$ is a variation coefficient of the curvature radius r', $G_{jk}Y^j$ is an aspheric coefficient, and the non-arc shape S includes a term of a fourth-order or higher; and when a relationship between an aspheric coefficient of any order among the aspheric coefficients included in the non-arc shape of the at least one optical surface of the optical element and a position in the main scanning direction is represented by a first function and a relationship between an imaging magnification of the second optical system in the sub-scanning direction and the position in the main scanning direction is represented by a second function, each of the first function and the second function has an extremum within an effective scanning area of the at least one optical surface.

2. An optical scanning apparatus according to claim 1, wherein the second optical system has a characteristic that causes an imaging magnification in the sub-scanning direction to vary in an asymmetric manner in the main scanning direction.

3. An optical scanning apparatus according to claim 1, wherein in each of the first function and the second function, the extremum which is located closest to the optical axis in the main scanning direction is located on a side where the light source is not arranged with respect to the optical axis in the main scanning direction.

4. An optical scanning apparatus according to claim 1, wherein the first optical system includes:
   a first aperture stop configured to limit a light beam width in the sub-scanning direction of the plurality of light beams respectively emitted from the plurality of light emitting parts; and
   a second aperture stop configured to limit a light beam width in the main scanning direction of the plurality of light beams respectively emitted from the plurality of light emitting parts.

5. An image forming apparatus, comprising:
   an optical scanning apparatus comprising:
      a light source including a plurality of light emitting parts;
      a deflector including a deflecting surface and configured to deflect a plurality of light beams respectively emitted from the plurality of light emitting parts for scanning by the deflecting surface in a main scanning direction;
      a first optical system configured to cause the plurality of light beams to enter the deflecting surface of the deflector at an oblique angle within a sub-scanning section perpendicular to the main scanning direction;
      a second optical system configured to focus the plurality of light beams deflected by the deflecting surface of the deflector on a surface to be scanned to form a plurality of spot images defining a plurality of scanning lines on the surface to be scanned,
      the plurality of light emitting parts being arranged away from each other in a sub-scanning direction perpendicular to the main scanning direction and to a direction of an optical axis of the second optical system,
      the second optical system including an optical element including at least one optical surface having a non-arc shape within the sub-scanning section, which asymmetrically varies in the main scanning direction, so that a wave optics interval in the sub-scanning direction between the plurality of scanning lines based on barycentric positions of the plurality of spot images on the surface to be scanned is aligned along the main scanning direction,
      when the non-arc shape of the at least one optical surface of the optical element within the sub-scanning section being defined by $$S = \frac{\frac{Z^2}{r'}}{1 + \sqrt{1 - (1+k)\left(\frac{Z}{r'}\right)^2}} + \sum_{k=1}^{16} \sum_{j=0}^{16} G_{jk} Y^j Z^k,$$

$$r' = r\left(1 + \sum_{i=2}^{10} D_i Y^i\right)$$

where S is the non-arc shape of the at least one optical surface of the optical element within the sub-scanning section, Y axis is an axis perpendicular to the optical axis in the main scanning direction, Z axis is an axis perpendicular to the optical axis in the sub-scanning direction, r is a curvature radius of the at least one optical surface on the optical axis within the sub-scanning section, r' is a curvature radius of the at least one optical surface within the sub-scanning section, $D_i$ is a variation coefficient of the curvature radius r', $G_{jk}Y^j$ is an aspheric coefficient, and the non-arc shape S including a term of a fourth-order or higher; and when a relationship between an aspheric coefficient of any order among the aspheric coefficients included in the non-arc shape of the at least one optical surface of the optical element and a position in the main scanning direction is represented by a first function and a relationship between an imaging magnification of the second optical system in the sub-scanning direction and the position in the main scanning direction is represented by a second function, each of the first function and the second function has an extremum within an effective scanning area of the at least one optical surface a developing unit configured to develop an electrostatic latent image formed on a photosensitive member arranged on the surface to be scanned by the plurality of light beams for scanning of the optical scanning apparatus into a toner image;
a transferring unit configured to transfer the developed toner image to a transfer material; and
a fixing unit configured to fix the transferred toner image to the transfer material.

6. An image forming apparatus according to claim 5, further comprising a printer controller configured to convert code data input from an external apparatus into an image signal and to input the converted image signal to the optical scanning apparatus.

7. An optical scanning apparatus, comprising:
a light source including a plurality of light emitting parts;
a deflector including a deflecting surface and configured to deflect a plurality of light beams respectively emitted from the plurality of light emitting parts for scanning by the deflecting surface in a main scanning direction;
a first optical system configured to cause the plurality of light beams to enter the deflecting surface of the deflector at an oblique angle within a sub-scanning section perpendicular to the main scanning direction; and
a second optical system configured to focus the plurality of light beams deflected by the deflecting surface of the deflector on a surface to be scanned to form a plurality of spot images defining a plurality of scanning lines on the surface to be scanned, wherein:

the plurality of light emitting parts are arranged away from each other in the main scanning direction and in a sub-scanning direction perpendicular to the main scanning direction and to a direction of an optical axis of the second optical system;

a light emitting part whose spot image is formed first in the main scanning direction among the plurality of light emitting parts is arranged at a position closer to a plane perpendicular to the sub-scanning direction and including a center of the deflecting surface of the deflector with respect to a light emitting part whose spot image is formed last in the main scanning direction, so as to obtain a first characteristic in which an interval in the sub-scanning direction between the plurality of scanning lines based on positions of principal rays of the plurality of light beams on the surface to be scanned varies in the main scanning direction;

the second optical system includes an optical element including at least one optical surface having a non-arc shape within the sub-scanning section, which asymmetrically varies in the main scanning direction, so as to obtain a second characteristic in which a sum of amounts of barycentric position shifts of the plurality of spot images with respect to the positions of the principal rays of the plurality of light beams on the surface to be scanned varies in the main scanning direction in a variation direction opposite to a variation direction in the first characteristic;

when the non-arc shape of the at least one optical surface of the optical element within the sub-scanning section is defined by $$S = \frac{\frac{Z^2}{r'}}{1 + \sqrt{1 - (1+k)\left(\frac{Z}{r'}\right)^2}} + \sum_{k=1}^{16} \sum_{j=0}^{16} G_{jk} Y^j Z^k,$$

$$r' = r\left(1 + \sum_{i=2}^{10} D_i Y^i\right)$$

where S is the non-arc shape of the at least one optical surface of the optical element within the sub-scanning section, Y axis is an axis perpendicular to the optical axis in the main scanning direction, Z axis is an axis perpendicular to the optical axis in the sub-scanning direction, r is a curvature radius of the at least one optical surface on the optical axis within the sub-scanning section, r' is a curvature radius of the at least one optical surface within the sub-scanning section, $D_i$ is a variation coefficient of the curvature radius r', $G_{jk}Y^j$ is an aspheric coefficient, and the non-arc shape S includes a term of a fourth-order or higher.

8. An optical scanning apparatus according to claim 7, wherein the second optical system has a characteristic that causes an imaging magnification in the sub-scanning direction to vary in an asymmetric manner in the main scanning direction.

9. An optical scanning apparatus according to claim 7, wherein when a relationship between an aspheric coefficient of any order among the aspheric coefficients included in the non-arc shape of the at least one optical surface of the optical element and a position in the main scanning direction is represented by a first function and a relationship between an imaging magnification of the second optical system in the sub-scanning direction and the position in the main scanning direction is represented by a second function, each of the first function and the second function has an extremum within an effective scanning area of the at least one optical surface.

10. An optical scanning apparatus according to claim 9, wherein in each of the first function and the second function, the extremum which is located closest to the optical axis in the main scanning direction is located on a side where the light source is not arranged with respect to the optical axis in the main scanning direction.

11. An optical scanning apparatus according to claim 7, wherein the first optical system includes:

a first aperture stop configured to limit a light beam width in the sub-scanning direction of the plurality of light beams respectively emitted from the plurality of light emitting parts; and a second aperture stop configured to limit a light beam width in the main scanning direction of the plurality of light beams respectively emitted from the plurality of light emitting parts.

12. An image forming apparatus, comprising:
an optical scanning apparatus comprising:

a light source including a plurality of light emitting parts;

a deflector including a deflecting surface and configured to scanningly deflect a plurality of light beams respectively emitted from the plurality of light emitting parts by the deflecting surface in a main scanning direction;

a first optical system configured to cause the plurality of light beams to enter the deflecting surface of the deflector at an oblique angle within a sub-scanning section perpendicular to the main scanning direction;

a second optical system configured to focus the plurality of light beams deflected by the deflecting surface of the deflector on a surface to be scanned to form a plurality of spot images defining a plurality of scanning lines on the surface to be scanned, the plurality of light emitting parts being arranged away from each other in the main scanning direction and in a sub-scanning direction perpendicular to the main scanning direction and to a direction of an optical axis of the second optical system, a light emitting part whose spot image is formed first in the main scanning direction among the plurality of light emitting parts being arranged at a position closer to a plane perpendicular to the sub-scanning direction and including a center of the deflecting surface of the deflector with respect to a light emitting part whose spot image is formed last in the main scanning direction, so as to obtain a first characteristic in which an interval in the sub-scanning direction between the plurality of scanning lines based on positions of principal rays of the plurality of light beams on the surface to be scanned varies in the main scanning direction, the second optical system including an optical element including at least one optical surface having a non-arc shape within the sub-scanning section, which asymmetrically varies in the main scanning direction, so as to obtain a second characteristic in which a sum of amounts of barycentric position shifts of the plurality of spot images with respect to the positions of the principal rays of the plurality of light beams on the surface to be scanned varies in the main scanning direction in a variation direction opposite to a variation direction in the first characteristic, when the non-arc shape of the at least one optical surface of the optical element within the sub-scanning section being defined by $$S = \frac{\frac{Z^2}{r'}}{1+\sqrt{1-(1+k)\left(\frac{Z}{r'}\right)^2}} + \sum_{k=1}^{16}\sum_{j=0}^{16} G_{jk}Y^j Z^k,$$

$$r' = r\left(1+\sum_{i=2}^{10} D_i Y^i\right)$$

where S is the non-arc shape of the at least one optical surface of the optical element within the sub-scanning section, Y axis is an axis perpendicular to the optical axis in the main scanning direction, Z axis is an axis perpendicular to the optical axis in the sub-scanning direction, r is a curvature radius of the at least one optical surface on the optical axis within the sub-scanning section, r' is a curvature radius of the at least one optical surface within the sub-scanning section, $D_i$ is a variation coefficient of the curvature radius r', $G_{jk}Y^j$ is an aspheric coefficient, and the non-arc shape S including a term of a fourth-order or higher;

a developing unit configured to develop an electrostatic latent image formed on a photosensitive member arranged on the surface to be scanned by the plurality of light beams for scanning of the optical scanning apparatus into a toner image;

a transferring unit configured to transfer the developed toner image to a transfer material; and a fixing unit configured to fix the transferred toner image to the transfer material.

13. An image forming apparatus according to claim 12, further comprising a printer controller configured to convert code data input from an external apparatus into an image signal and to input the converted image signal to the optical scanning apparatus.

* * * * *